Jan. 5, 1954     W. P. LOUDON     2,664,951
MEANS TO PUNCH A SPECIAL CODE BY LOCKING
DATA LEVERS BY TRANSACTION LEVER
Original Filed Sept. 16, 1949     12 Sheets-Sheet 1
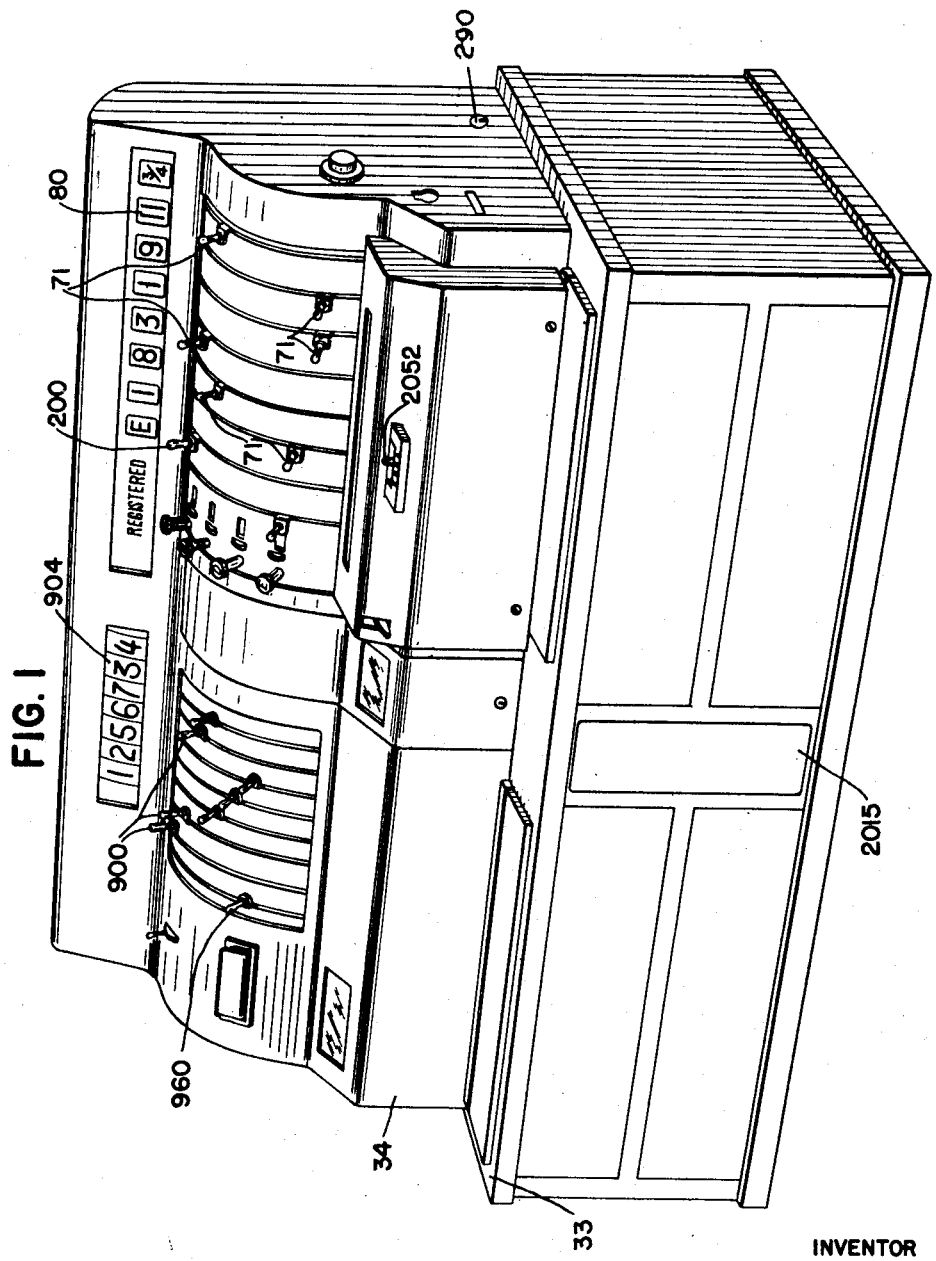
INVENTOR
WARREN P. LOUDON
BY
HIS ATTORNEYS

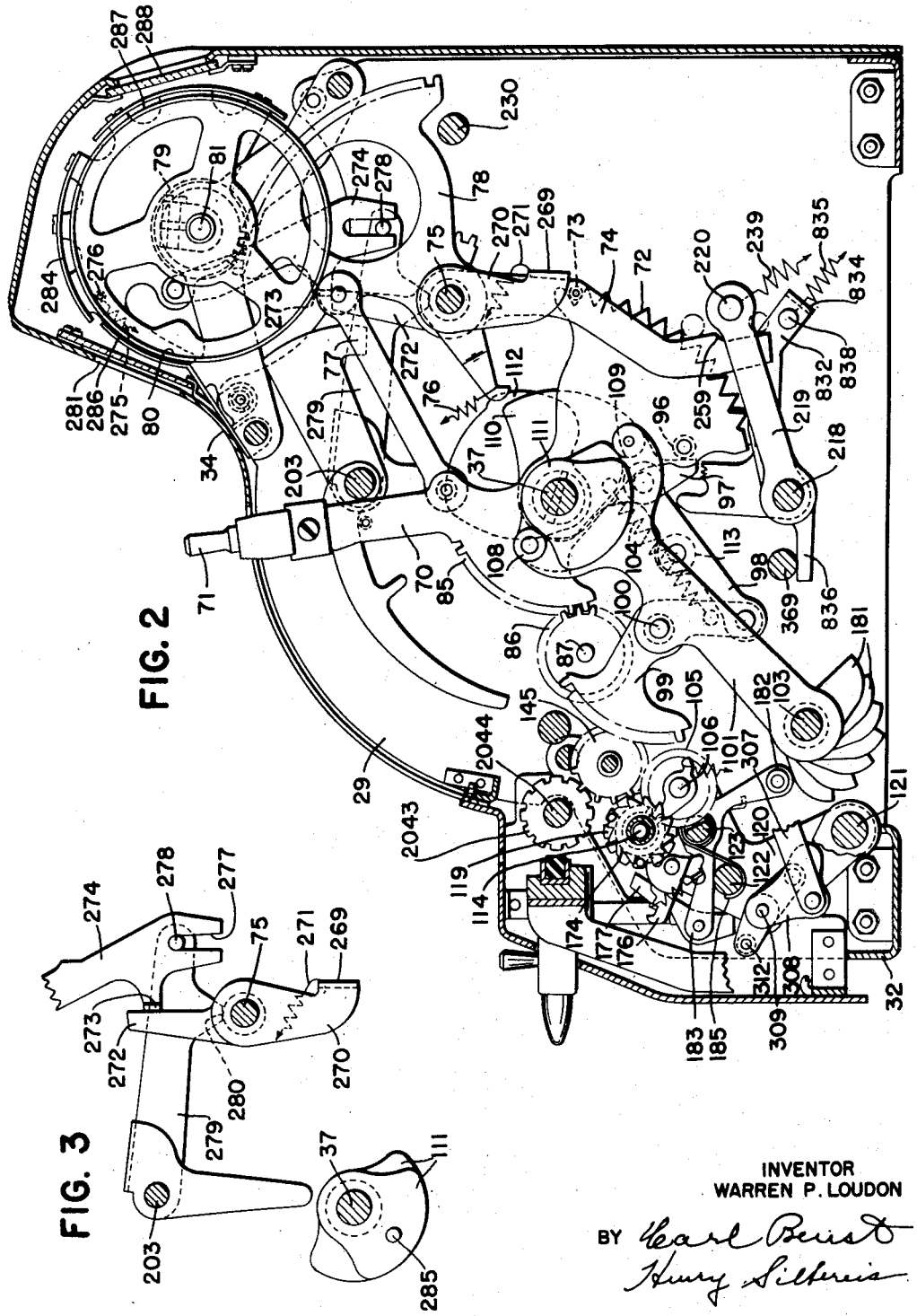

INVENTOR
WARREN P. LOUDON
BY
HIS ATTORNEYS

Jan. 5, 1954 W. P. LOUDON 2,664,951
MEANS TO PUNCH A SPECIAL CODE BY LOCKING
DATA LEVERS BY TRANSACTION LEVER
Original Filed Sept. 16, 1949 12 Sheets-Sheet 4
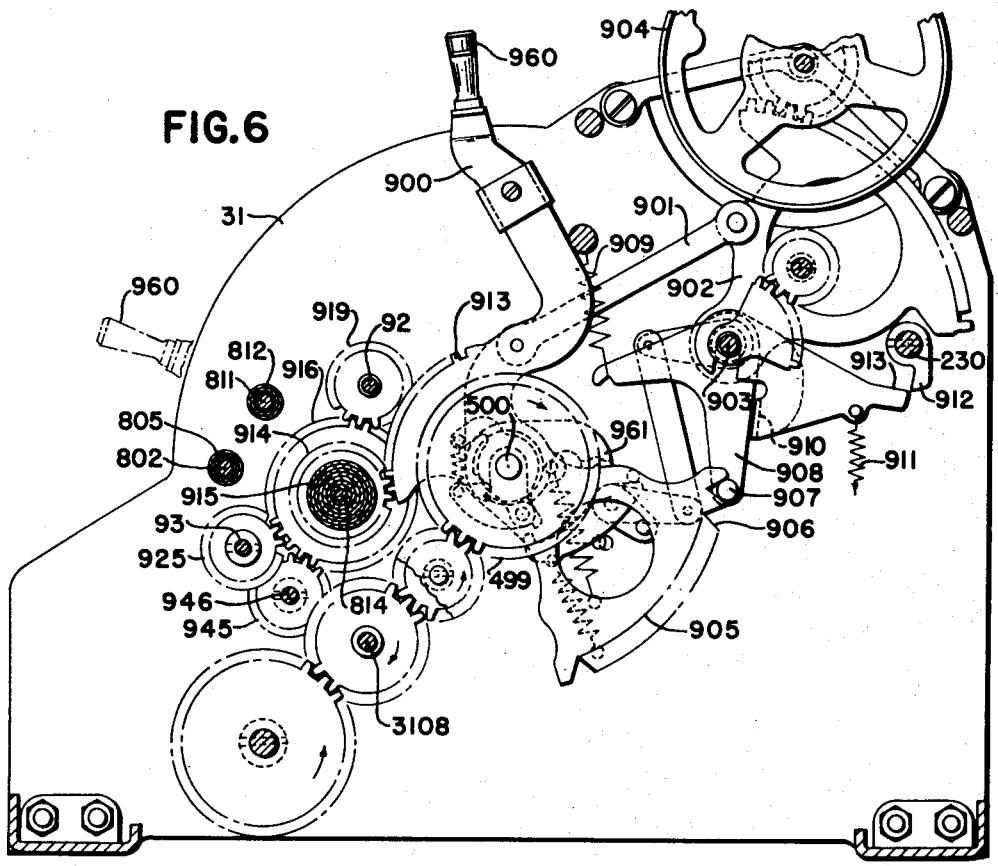
INVENTOR
WARREN P. LOUDON
BY
HIS ATTORNEYS Jan. 5, 1954  W. P. LOUDON  2,664,951
MEANS TO PUNCH A SPECIAL CODE BY LOCKING
DATA LEVERS BY TRANSACTION LEVER
Original Filed Sept. 16, 1949  12 Sheets-Sheet 5
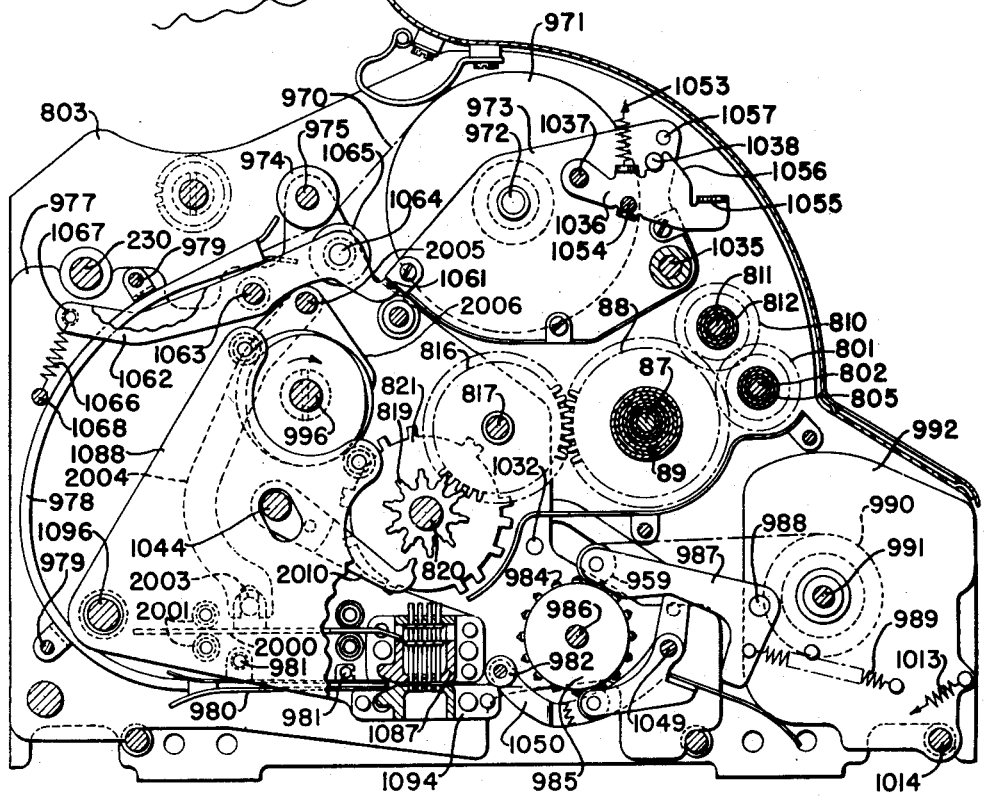
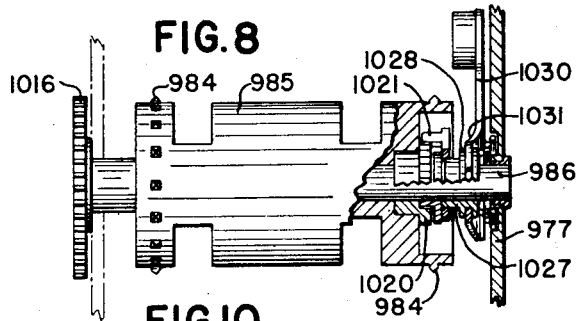
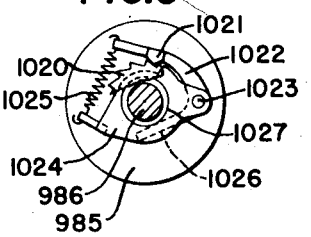
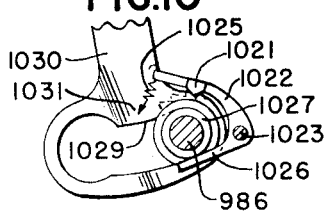
INVENTOR
WARREN P. LOUDON
BY *Carl Beust*
*Henry Silbereis*
HIS ATTORNEYS

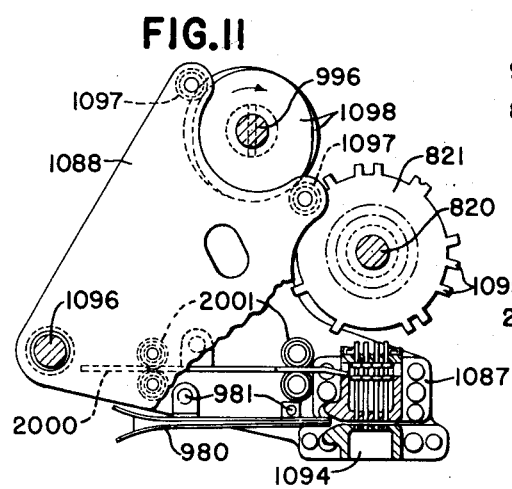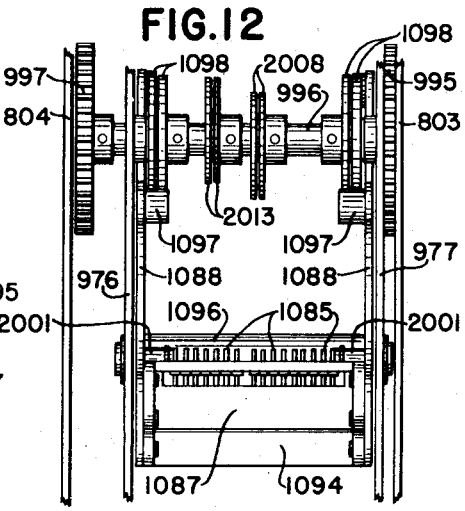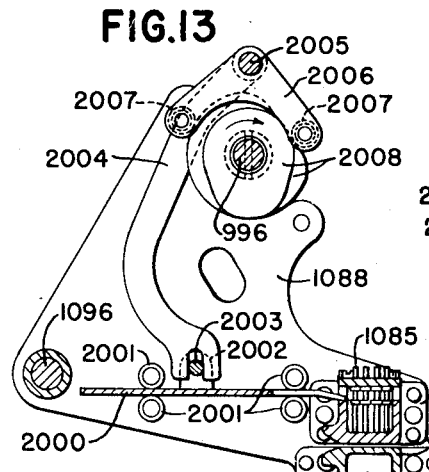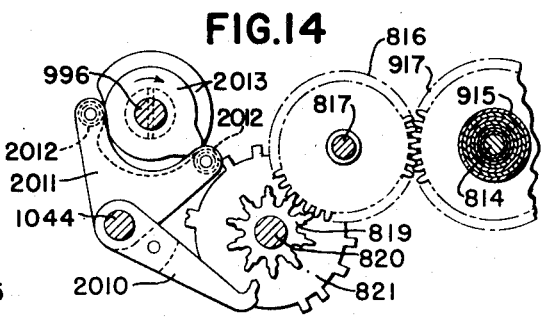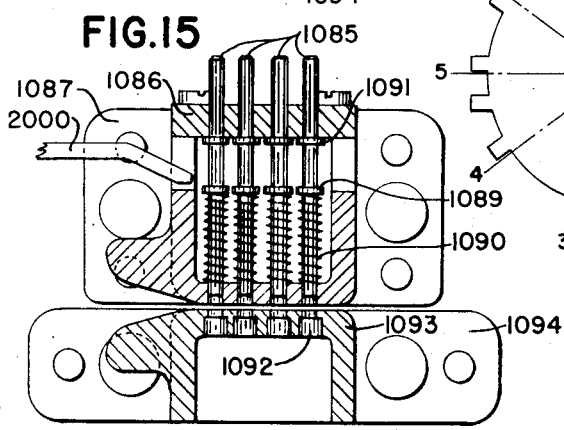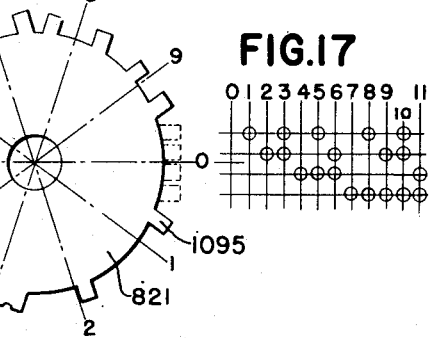
INVENTOR
WARREN P. LOUDON
HIS ATTORNEYS Jan. 5, 1954 W. P. LOUDON 2,664,951
MEANS TO PUNCH A SPECIAL CODE BY LOCKING
DATA LEVERS BY TRANSACTION LEVER
Original Filed Sept. 16, 1949 12 Sheets-Sheet 7

INVENTOR
WARREN P. LOUDON

BY Carl Beust
Henry Silberis

HIS ATTORNEYS

Jan. 5, 1954   W. P. LOUDON   2,664,951
MEANS TO PUNCH A SPECIAL CODE BY LOCKING
DATA LEVERS BY TRANSACTION LEVER
Original Filed Sept. 16, 1949   12 Sheets-Sheet 8

INVENTOR
WARREN P. LOUDON
BY Carl Benst
Henry Silberis
HIS ATTORNEYS

Jan. 5, 1954 — W. P. LOUDON — 2,664,951
MEANS TO PUNCH A SPECIAL CODE BY LOCKING DATA LEVERS BY TRANSACTION LEVER
Original Filed Sept. 16, 1949 — 12 Sheets-Sheet 9
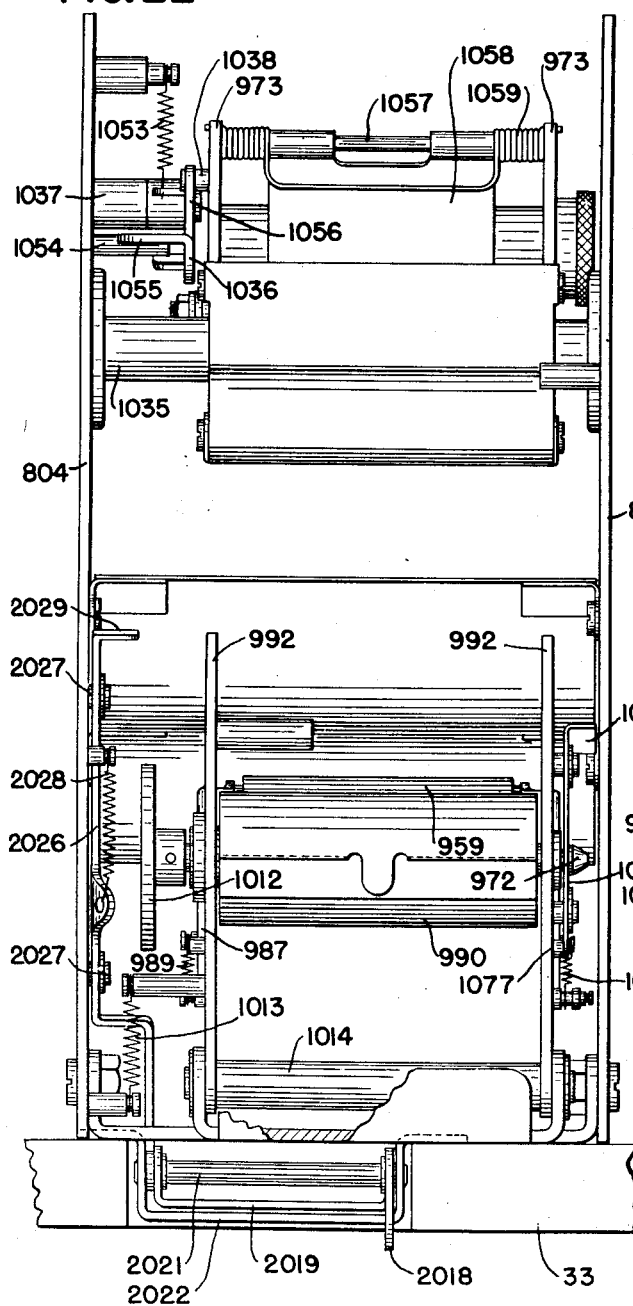
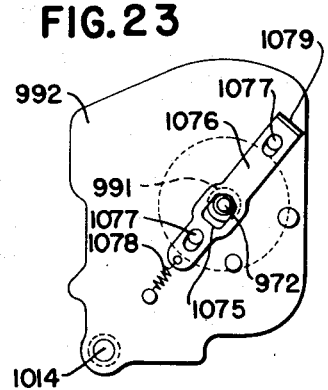
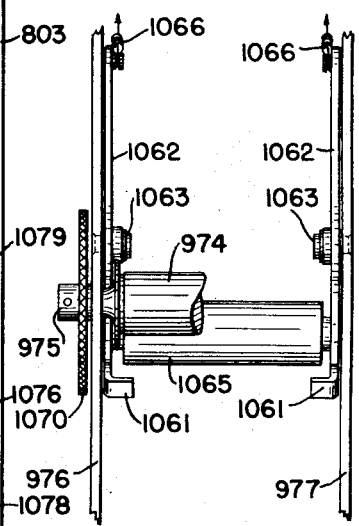
INVENTOR
WARREN P. LOUDON
BY *Earl Beust*
*Henry Silberis*
HIS ATTORNEYS

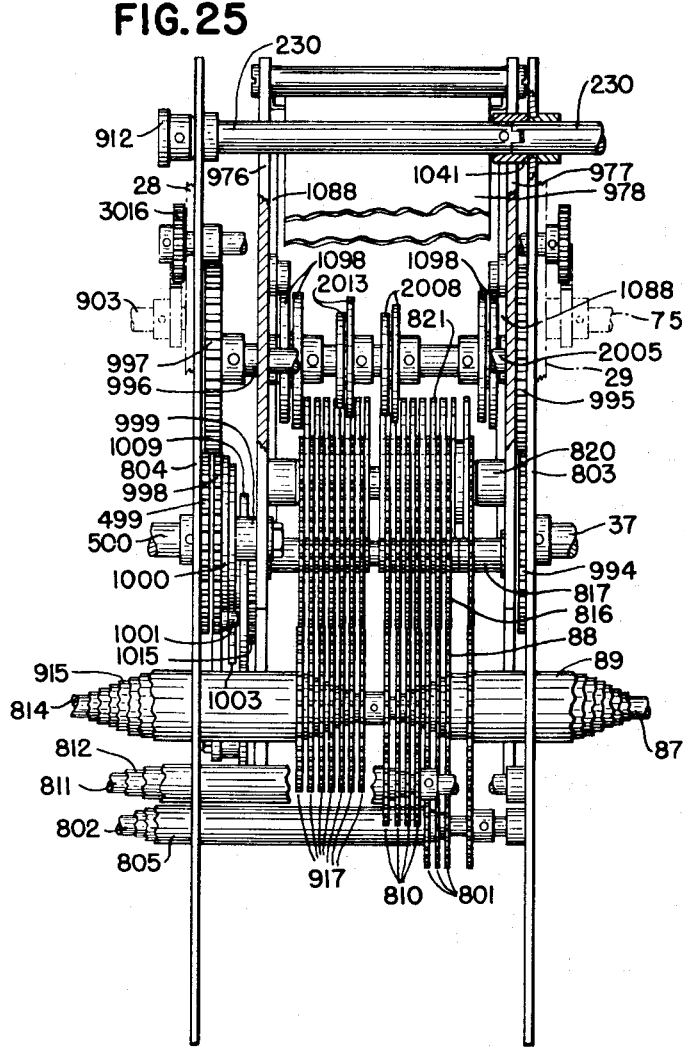

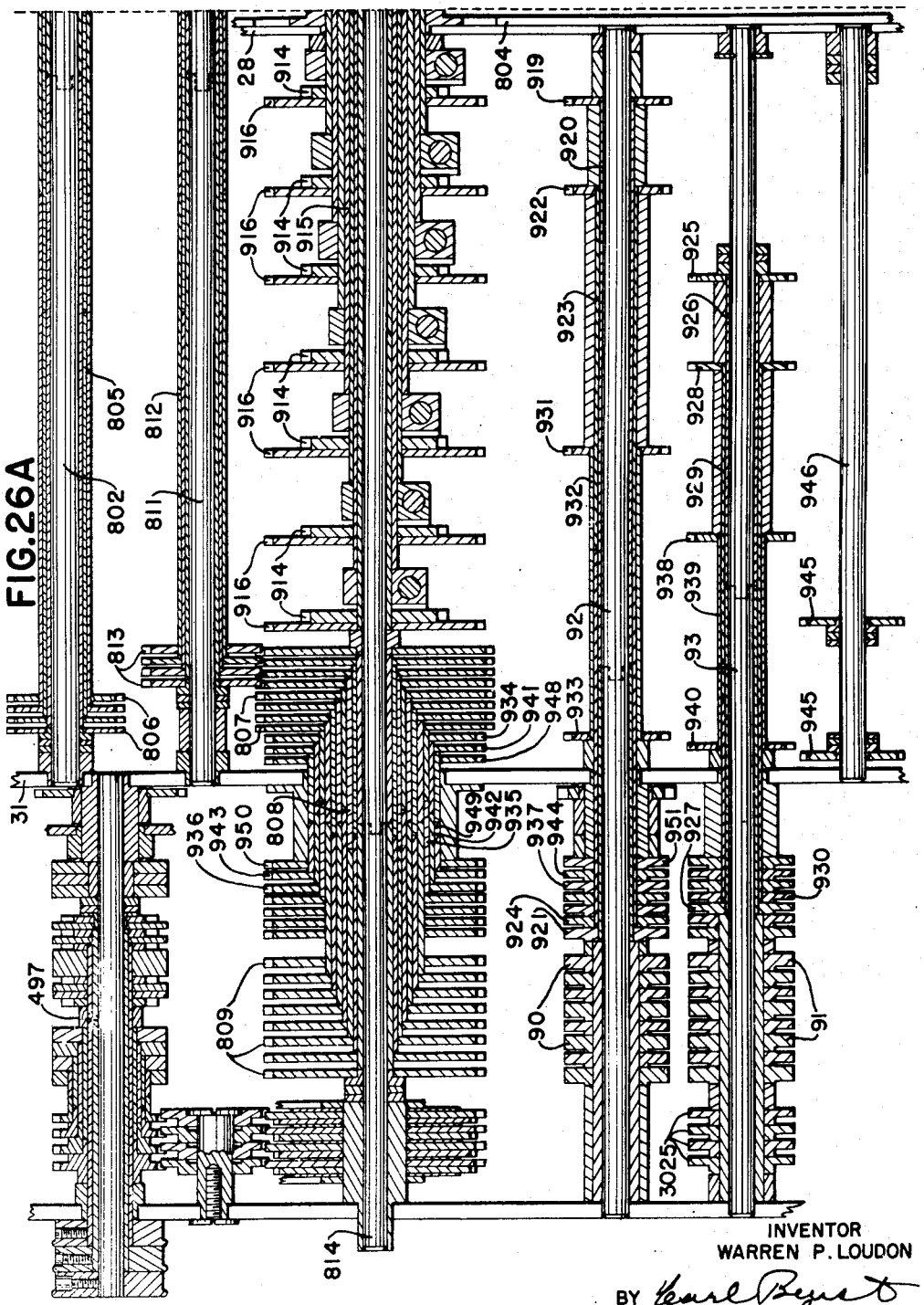

Jan. 5, 1954
W. P. LOUDON
2,664,951
MEANS TO PUNCH A SPECIAL CODE BY LOCKING
DATA LEVERS BY TRANSACTION LEVER
Original Filed Sept. 16, 1949
12 Sheets-Sheet 12
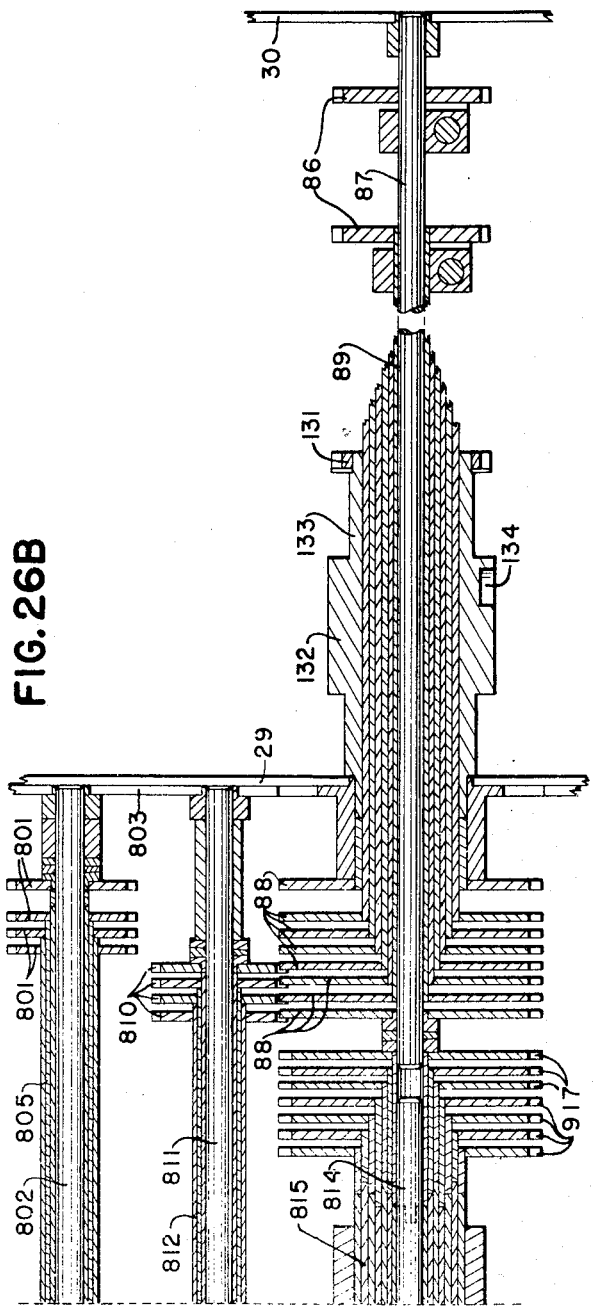
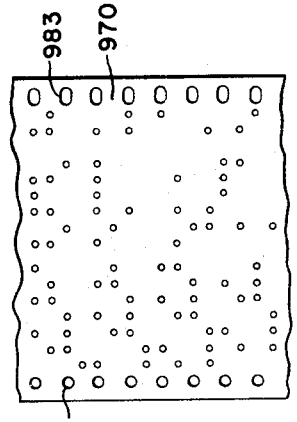
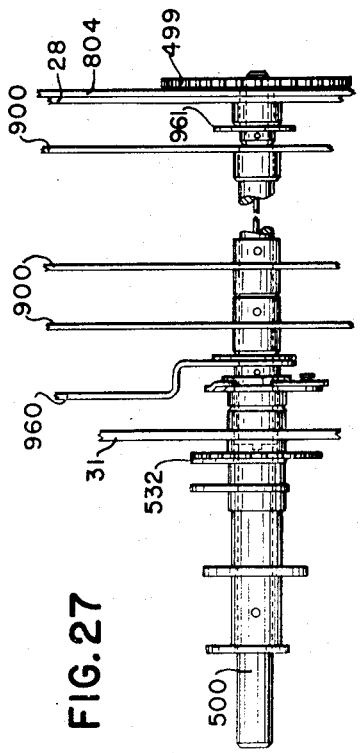
INVENTOR
WARREN P. LOUDON
BY
HIS ATTORNEYS Patented Jan. 5, 1954

2,664,951

UNITED STATES PATENT OFFICE 2,664,951

MEANS TO PUNCH A SPECIAL CODE BY LOCKING DATA LEVERS BY TRANSACTION LEVER

Warren P. Loudon, Tucson, Ariz., assignor to The National Cash Register Company, Dayton, Ohio, a corporation of Maryland Original application September 16, 1949, Serial No. 116,004, now Patent No. 2,628,774, dated February 17, 1953. Divided and this application March 22, 1951, Serial No. 216,918

10 Claims. (Cl. 164—112)

This invention relates to improvements in printing and perforating mechanism for accounting machines.

This application is a division of application, Serial No. 116,004, filed September 16, 1949, now Patent No. 2,628,774.

The invention is shown applied to a machine of the type disclosed in United States Patent No. 2,209,763, issued to Ernst Breitling on July 30, 1940, and in the co-pending United States applications of Frank R. Werner, Serial No. 46,165, filed August 25, 1948; Serial No. 58,114, filed November 3, 1948; and Serial No. 102,658, filed July 1, 1949, now Patent No. 2,587,019, issued February 26, 1952, all of which have been assigned to the assignee of the present application.

The principal object of the invention is to provide a machine of the type disclosed in the above patents and applications for use by cooperative societies, and, as illustrated herein, the machine is especially adapted for use in Great Britain, where cooperative societies are well organized and consist of many cooperating stores.

Another object of the invention is to provide a machine of the type disclosed with a mechanism for producing a perforated tape which can be audited at a central station.

A specific object of the invention is to provide a novel perforating mechanism and control means therefor.

Another specific object of the invention is to provide mechanism, adjusted under control of amount setting manipulative devices, for perforating a special code on the perforated tape when a sale to a non-member of a cooperative society is recorded, to effect a special control over the auditing machine in which the perforated tape is later analyzed.

Another specific object of the invention is to provide a machine of the type disclosed with an audit tape printing mechanism, a printed receipt issuing mechanism, and a perforating mechanism to punch records on a second tape, together with an automatic control for simultaneously disabling the receipt issuing mechanism and recording a special code on the said second tape, for non-members.

Another object of the invention is to provide an interlock to prevent the adjustment of amount setting manipulative devices when a special manipulative device is moved into a certain position to cause a special code to be punched on the perforated tape, under control of the amount setting manipulative devices, during the subsequent operation of the machine.

A specific object of the invention is to provide a perforating mechanism with a safety device to positively return any punches which may not return to home position after the punching operation has been completed.

With these and incidental objects in view, the invention includes certain novel features of construction and combinations of parts, a preferred form or embodiment of which is hereinafter described with reference to the drawings which accompany and form a part of this specification.

Of said drawings:

Fig. 1 is a perspective view showing the keyboard arrangement of the machine.

Fig. 2 is a cross-sectional view taken through a datum, usually an amount bank and illustrates the total printing mechanism.

Fig. 3 is a detail view of the indicator flash mechanism.

Fig. 6 is a detail view showing the account number lever and the connections actuated thereby.

Fig. 7 is a sectional view taken through a perforating section of the machine.

Fig. 8 is a detail view showing the feed drum for the perforated record with a part thereof broken away to illustrate the driving mechanism therefor.

Fig. 9 is a detail view of a part of the driving mechanism for the perforated record strip feeding drum.

Fig. 10 is a detail view of a means to disconnect the perforator feeding drum from its driving means.

Fig. 11 is a detail view showing the mechanism for operating the perforating punches.

Fig. 12 is the end elevation of the mechanism shown in Fig. 11.

Fig. 13 is a detail view showing the mechanism for positively returning the punches of the perforating mechanism in the event the punches should stick.

Fig. 14 is a detail view of a part of the driving connections for the punch operating disc, together with an alining mechanism therefor.

Fig. 15 is an enlarged detail view showing the punch construction.

Fig. 16 is a detail view of the punch control disc, showing the code arrangement thereon.

Fig. 17 is a detail view of the code used in the punching system in the present machine.

Fig. 22 is a front elevational view showing the location of the supply and receiving roll receptacles.

Fig. 23 is a detail view of the latch for latching the paper receiving spool of the perforating mechanism in position.

Fig. 24 is a detail end elevation showing the mechanism for hand-spacing the record material to be perforated.

Fig. 25 is an end view showing the connections from the amount section and the account number section for setting up the perforating control discs, together with the cam shaft for actuating the perforator mechanisms.

Figure 4:
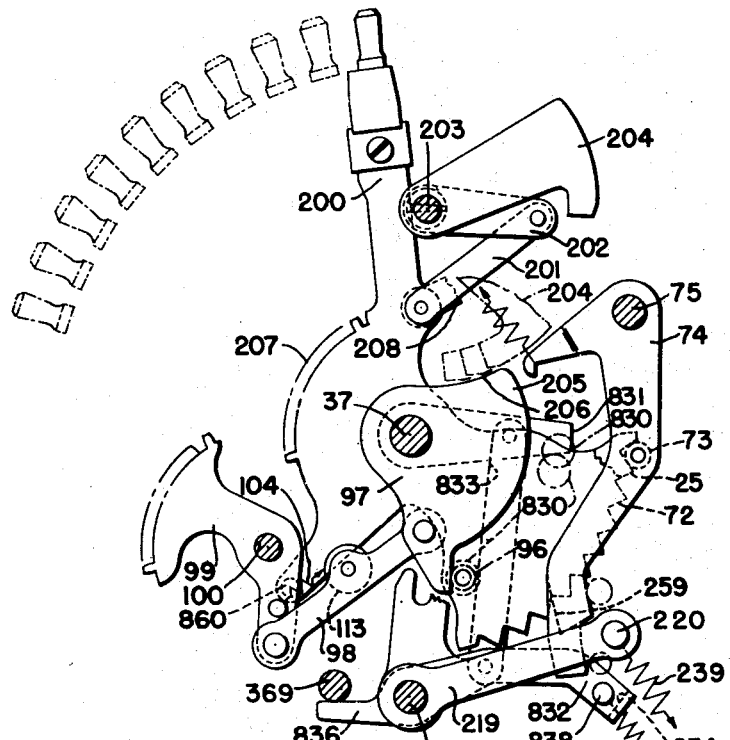
Fig. 4 is a detail view of a special transaction lever and certain interlocks actuated thereby.

Figs. 26A and 26B, taken together, constitute a sectional view, in spread-out relationship, showing the connections between the amount setting levers and the account number levers for setting up the perforating control plates and the type wheels.

Fig. 27 is a front elevation showing some of the cams on the adult strip cam shaft and certain of the frames for supporting the same.

Fig. 28 is a facsimile of a part of the perforated record produced by the machine.

*General description*

The machine embodying the present invention is provided with a printer section near the lower left-hand end thereof (Fig. 1) and with an account number keyboard section at the upper left-hand end thereof, comprising a plurality of account member setting levers, there being seven such levers illustrated in the present machine. Next to the printer section and the account number setting levers, to the right thereof, is a section in which a perforating mechanism for perforating an audit strip is provided. The right-hand half of the keyboard of the machine comprises a set of amount setting levers, a transaction lever, and a clerk's lever, together with four keys for releasing the machine for operation.

Each setting lever—that is, the amount levers, the account number levers, the transaction lever, and the clerk's lever—is connected to a corresponding rotary type of indicator, and each lever is geared to a type wheel for printing upon an issuing strip and to a corresponding type wheel for printing data upon a detail strip. The levers are also connected to a corresponding perforator control disc for selecting punches for perforating data on a tape, which tape is preperforated with feed holes. The positioning of the levers posiitons the corresponding indicators and type wheels, together with the perforator selecting disc. Each amount lever controls a related actuator, which actuates the corresponding wheel of a selected totalizer on the totalizer line. A plurality of interspersed totalizers are provided, which are selected for actuation by a clerk's lever. Positioning of the amount levers positions their actuators in proportion thereto, and, upon operation of the machine, the actuators are engaged with the selected totalizer wheels, after which said actuators are returned from set position to zero position and, in being so returned, rotate the wheels of the selected totalizer to enter therein the amount set upon the levers. After the actuators have been returned to zero, they are disengaged from the totalizer wheels and during the latter part of the machine operation are returned to zero positions.

Mechanism rendered effective upon engagement of the actuators with the totalizer, in cooperation with the amount lever retaining means, locks the levers and connected mechanism in set positions while the actuators are engaged with the totalizer. The totalizer of the instant machine has a well-known type of carrying mechanism for transferring amounts from lower to higher denominations, and the carrying mechanism is adapted to the British monetary system.

The present machine is provided with an indicator for indicating when an amount is or is not registered. The settable levers remain in their set positions after termination of machine operation and may be moved from their old position directly to a new position. Moving any one of the amount levers from one position to another releases a latch mechanism that frees a registration indicator to the actuation of a spring, which immediately shifts said indicator from a "Register" position to a "Non-Register" position, which indicates that the amount being set up has not yet been registered. Upon operation of the machine, mechanism becomes effective to return the registration indicator from the "Non-Register" position to the "Register" position, whereupon the latch mechanism becomes effective to retain said indicator in "Register" position.

Near the end of machine operation, mechanism becomes effective to release a latch mechanism which normally retains the cash drawers in closed position, thus freeing a selected cash drawer to the action of a spring which immediately opens said selected cash drawer.

The machine as illustrated herein is provided with four interspersed totalizers, one for each of four clerks. A clerk's lever is settable to select one of the interspersed totalizers for receiving entries. Adjacent the totalizer selecting lever is a bank of keys, one assigned to each clerk. The keys are of the removable type, so that the clerk may carry the key on his person. The clerk may insert his key into the lock provided therefor, and, upon depression of the key after it is inserted into the lock, the machine is released for operation.

A settable lever is also provided to control the entry of amounts into the selected totalizers so that only the "Cash" and "Received-on-Account" items are entered. When the lever is positioned in the "Charge" position or a "Paid-Out" position, a device is set to prevent the amount actuators from receiving the differential movement under control of the amount setting levers. A settable lever is also provided to set up data on the type wheels and on the perforating control plates for identifying the type of operation being performed. In certain business systems, particularly in cooperative stores, as operated in Great Britain, in which members of a cooperative association are entitled to receive rebates, a record is kept of their particular accounts. If a customer who is a non-member of the association makes a purchase, it is then desirable to punch a special code on the perforated strip indicating such, so that the data will not be added into an account. In order to control such auditing, a special code is perforated on the perforated strip before the entry of the sale to a non-member is entered into the machine. Setting of the transaction lever to its ninth position controls certain interlocks in the machine, which prevents the adjustment of the amount levers and also prevents operation of a receipt printing and issuing mechanism. Thereafter, upon operation of the machine with the amount levers all set at zero, a special code is punched in the perforated strip adjacent the non-member's account number, which account number may represent an account number of another association, and therefore, when the perforated strip is later analyzed, the special code perforated on the strip controls the analyzing machine to skip the entry of the amount which is entered on the perforated strip immediately following the operation in which the code is punched. After the code is punched, the amount of the purchase is set up on the amount levers and the normal operation of the machine is made, whereupon the data is perforated on the strip.

A special counter is provided adjacent the clerk's key, and the special counter corresponding to the depressed clerk's key is operated to count one unit, so that the number of operations of the machine with respect to the clerk's key depressed are counted. At the end of a given time, the manager can check to determine how many transactions each clerk handles during the business period.

Conveniently located on the right-hand side of the machine cabinet is a control lock 290, which controls the operations of the machine, such as locking the machine against operation, printing of totals from the totalizers, opening of the cash drawers without a machine operation, and locking the machine against release. The possessor of the key to the control lock 290 may position the lock to any one of three positions. When the lock is in its intermediate position, the machine may be operated for entering amounts into the totalizer and for issuing a receipt, printing on the audit tape, and perforating the record strip. When the lock is in its extreme counter-clockwise position, the machine is locked against operation. When the lock is in its extreme clockwise position, the printing hammer for printing on an insertable strip is released for operation, whereupon a totalizer can be selected for recording data on the insertable slip; or, when the modified form of printing mechanism is used, the impressions are made from all of the totalizers simultaneously.

When the lock is in the extreme clockwise position, the totalizer can also be reset to zero.

The machine embodying the instant invention has three lines of type wheels in the printer section of the machine, two of which are used to print records on an issuing receipt, and the other for making records on an audit tape, which is retained in the machine and which may be removed at the end of any business period.

Two of the type wheel lines have an amount type wheel for each amount lever, a type wheel for the transaction lever, and a type wheel for the clerk's lever. These type lines are also provided with a type wheel for each of the account number levers, so that the account number may be printed on the issuing receipt and also on the audit tape. Each of the above type wheels is connected to its respective lever to be positioned thereby.

In addition to the type wheels above mentioned, the type wheel line for printing on the audit tape is provided with a plurality of consecutive number type wheels which are automatically advanced one step each machine operation. The consecutive number wheels and the wheels of the totalizer may be reset to zero at will by any authorized person having possession of a reset wrench for this purpose.

*Detailed description*

FRAMEWORK

Figure 5:
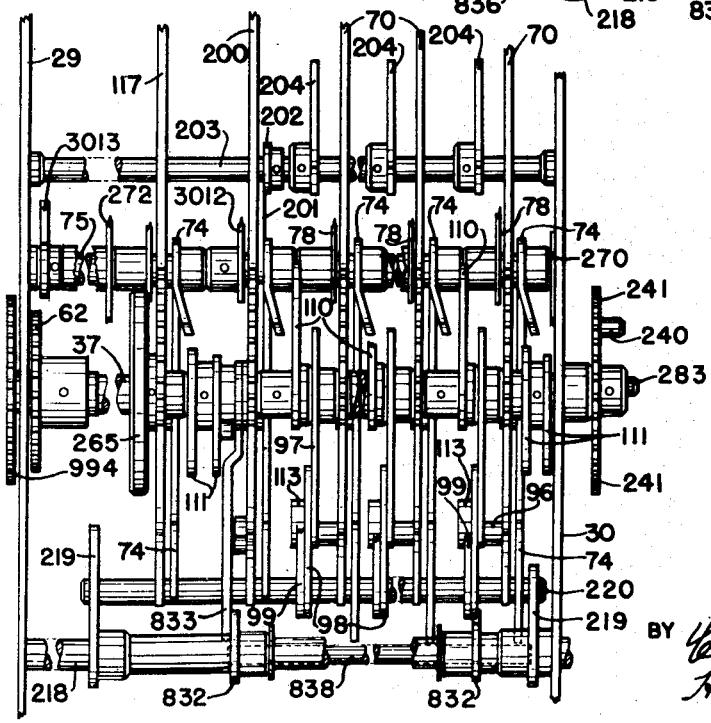
Fig. 5 is a detail front elevational view showing the side spacing of the clerks' transaction and amount levers.

The machine is built in three sections and is thereafter assembled into a complete machine. The mechanism of the right-hand section of the machine, which includes the amount, transaction, and clerks' manipulative devices, is supported by a pair of frames 29 and 30 (Figs. 2, 5 and 26B). The center section of the machine, which includes the perforator mechanism, is supported by a pair of frames 803 and 804 (Figs. 7, 12, 18, 22, 25, 26A, 26B and 27). The mechanism of the left-hand section of the machine, which includes the account number manipulative devices and the printing mechanism, is supported by a pair of frames 28 and 31 (Figs. 6, 25 and 26A). Each pair of frames is connected by various cross rods, shafts, and base plates 32 to form the three sections, which are mounted side by side on a drawer cabinet top 33 (Fig. 1), to form a unitary machine. Suitable means are provided to connect such mechanisms as extend into one of the three sections from another section. The mechanisms of the three sections of the machine are enclosed in a single cabinet 34, secured to the various frames by any suitable means.

*Amount differential mechanism*

Loose on the main shaft 37 (Figs. 2 and 5) is an amount lever 70 for each denominational order, an upward extension of which terminates in a finger piece 71 (see also Fig. 1), which protrudes through a corresponding arcuate opening in the cabinet 34. Each of the levers 70 has a plurality of V-shaped notches 72 cut in a segmental portion thereof. Said notches correspond to the different positions of the levers and are adapted to cooperate with respective rollers 73, each of which is mounted upon a corresponding lever 74, loose on a shaft 75 supported by the frames 29 and 30. A spring 76, connected to each lever 74, urges the levers 74 clockwise to maintain the rollers 73 in engagement with the notches 72, thereby providing a means for locating and retaining the amount levers 70 in set positions. Each of the setting levers 70 is connected by a link 77 to a corresponding gear sector 78, loose on the shaft 75 and having teeth which mesh with the teeth of a corresponding gear 79, integral with a front indicator 80, supported by a shaft 81, journaled in the frames 29 and 30. The lowest order front indicator 80 is pinned to the shaft 81, as is also the lowest order rear indicator (not shown), while the higher order front indicators are connected by nested tubes to their corresponding higher order rear indicators, said nested tubes being rotatably supported upon the shaft 81.

Each of the settable levers 70 has a segmental portion of gear teeth 85, which mesh with a corresponding drive gear 86. The lowest order drive gear 86 is secured on a shaft 87 (see also Fig. 26B), journaled in the frame 30 at its right-hand end (Fig. 26B) and in a bearing carried by the intermediate frame 29, in which a bearing for a series of tubes 89 is mounted, and the shaft 87 is mounted within the innermost sleeve. Each sleeve carries a drive gear 86 for meshing with the gear teeth 85 of corresponding higher order levers 70. The shaft 87 and each tube 89 have a corresponding type wheel drive gear 88 secured thereto.

The four highest order drive gears 88 mesh with gears 801 (see also Fig. 7), the lowest order of which is secured to a shaft 802 journaled in bearings in the frames 31, 803, and 804 (Figs. 26A and 26B). The three next higher order gears 801 are secured to the ends of a series of tubes 805, carried by the shaft 802. The left ends of the shaft 802 and of each of the tubes 805 have a gear 806 secured thereon (see Fig. 26A). The gears 806 mesh with gears 807 on the ends of tubes 808, extending into the printer section at the left side of the machine. The tubes 808 have secured thereto type wheel drive gears 809. The tubes 808 are journaled in a bearing carried by the frame 31.

The drive gears 88 for the lowest order amount levers mesh with gears 810, one secured to a shaft 811 and the other secured to the innermost tube of a series of tubes 812 on a shaft 811, and the latter is journaled in the frames 31 and 803. Gears 813, secured to the left end of the shaft 811 and the sleeves 812, mesh with gears 807 on the series of tubes 808, having secured thereto type wheel drive gears 809. The type wheel drive gears 809 mesh with corresponding amount type wheels 90 of the upper or receipt type wheel line and with the corresponding amount type wheels 91 of a lower or detail strip type wheel line. The receipt type wheels 90 are rotatably mounted on a shaft 92, carried by the frames 31 and 28, and the detail type wheels 91 are rotatably mounted on a shaft 93, also carried by the frames 31 and 28.

The drive gears 88 are located in the center or perforator section of the machine, and they mesh with gear 816 (Fig. 7) rotatable on a shaft 817 carried by a pair of frames 976 and 977, which are a part of a removable unit later described. The gear 816 meshes with pinions 819 on a stud 820 carried in frames 976 and 977. The pinions 819 are secured to corresponding perforator selector discs 821.

It is therefore obvious from the foregoing description that the positioning of the amount lever 70 positions the corresponding front and back indicators 80, the corresponding type wheels 90 and 91, and the corresponding perforator selector discs 821 in proportion to the position of said levers.

Each of the amount levers 70 (Fig. 2) carries a stud 96, which cooperates with a corresponding arm 97 loose on the shaft 37, which arm 97 is connected by a link 98 to an arm of a segmental gear 99, loose on a rod 100, supported by a plurality of plates 101, loose on a shaft 103, journaled in the frames 29 and 30. The plates 101 are held in rigid relation to each other by the rod 100, and the entire assembly forms a rockable frame adapted to rock the teeth of the segments 99 into engagement with teeth of corresponding totalizer drive gears 105, loose on a shaft 106 supported by the frames 29 and 30. The gears 105 mesh with pinions (not shown) on shaft 114, each pinion being secured to a sleeve rotatably supported in bearings in totalizer plates 120. Totalizer wheels 119 (Fig. 2) are selectively coupled to the sleeve by means described hereinafter. A spring 104 (Fig. 2), tensioned between each of the segments 99 and the arms 97, urges said segments and the arms 97 counter-clockwise, as viewed in Fig. 2, to maintain said arms 97 in constant contact with the studs 96. It is therefore evident that, when the amount levers 70 are positioned, the spring 104 causes the arm 97 to follow the stud 96, thereby positioning the corresponding segments 99 to positions commensurate with the setting of the amount lever 70.

Each plate 101 (Fig. 2) carries rollers 108 and 109, adapted to cooperate with their respective companion plate cams 110 and 111, fast on the main shaft 37. As previously explained, rotation of the main shaft 37 one clockwise rotation by means of the crank 38, or by the motor 41, completes an operation of the machine. Initial movement of the shaft 37 causes the cams 110 and 111, in cooperation with the rollers 108 and 109, to rock the framework composed of the plates 101 counter-clockwise to engage the teeth of the segments 99 with their corresponding totalizer gears 105. After the segments 99 have been engaged with the gears 105, continued movement of the main shaft 37 causes a cam 112 for each denominational order, secured on said main shaft 37, to engage corresponding rollers 113, mounted on the links 98, and return the segments 99 from set position clockwise to zero or normal position. This rotates the totalizer pinions 107 proportionate to the amount set up on the amount levers 70 to enter said amount in the selected totalizer wheels. A dwelling portion on the peripheries of the cams 112 causes the segment 99 to remain in zero position until further rotation of the shaft 37 causes the cams 110 and 111 to rock the segment frame clockwise to disengage the segments 99 from the totalizer gears 105, whereupon the declining surfaces on the cams 112 permit the springs 104 to return the segments 99, their associated links 98, and the arms 97 counter-clockwise to their set positions, which positions are determined by the arms 97 contacting the studs 96.

*Transaction control lever*

Adjacent the highest order amount lever 70, a lever 200 (Fig. 4) is provided for controlling movement of the totalizer actuating segment 99 to selectively prevent adding operations when desired. As illustrated herein, the six upper positions of the lever 200 permit the totalizer actuating mechanism to operate to enter the items set up on the amount levers 70 into the selected totalizer. When the lever 200 is moved into its seventh, eighth, or ninth positions, the amount entering mechanism is disabled, so that the amounts set up on the levers 70 are not entered into the selected totalizer. However, the amounts are printed on the detail strip and on the receipt when the receipt-printing mechanism is set for issuing a receipt and the transaction lever is set to any one of its first eight positions. An automatic mechanism is provided to throw off the receipt printing and issuing mechanism when the lever 200 is moved into its ninth position, in a manner described in the parent case.

The transaction lever 200 is pivoted on the beforementioned shaft 37 and has pivoted thereon a link 201 connected to an arm 202 secured to a shaft 203 carried by the frames 29 and 30. Also mounted on the shaft 203, adjacent each amount differential mechanism, is a lockout segment 204, which lies in the plane of a segment plate 205 integral with each of the beforementioned arms 97 in the amount banks. Movement of the lever 200 from the position shown in full lines in Fig. 4 into the seventh, eighth, or ninth position, shown in chain lines, through the link 201, the arm 202, and the shaft 203, rocks all of the lockout segments 204 clockwise to position their forward ends over a surface 206 on the segment plates 205 of the amount banks, to prevent the latter from rotating when the machine is operated. If the segment plates 205 and their integral arms 97 are arrested during the machine operation, the links 98 cannot partake of the differential movement under control of the studs 96, and therefore no amounts are added into the totalizer, although the segment gears 99 are rocked into engagement therewith. If, on the other hand, the lever 200 is in the position shown in Fig. 4, or in any one of its first six positions of adjustment, the lockout segments 204 remain out of the path of movement of the segment plates 205, and therefore the amounts are entered into the totalizer in the manner described hereinbefore when the machine is operated.

The lever 200 is provided with segment teeth 207, which engage with a pinion 86 (Fig. 26B) on one of the tubes 89 connected to the printing mechanism, to set up a type wheel in both the upper and the lower type lines, so that a designating symbol is printed on the receipt and on the detail strip, and also to set a perforator control disc 821 (Fig. 7) to perforate a corresponding symbol on the perforated strip.

An indicator to indicate the type of transaction being entered is also provided and is adjusted by a link 208 pivoted to the transaction lever 200 in the same manner described for setting the indicators by the amount levers 70.

*Interlock between transaction and amount banks*

In the system in which the present invention is to be used, it is necessary to prevent recording amounts on the perforated strip when the transaction lever 200 (Fig. 4) is in the lowermost, or "nine," position. To obtain such a result, a means actuated by the transaction lever positions a lock on the path of the lever 74 in each amount bank to lock the respective studs 73 in the notches 72 of the amount lever.

To accomplish this result, the transaction lever 200 is provided with a stud 830, which is moved into the chain-line position when the lever is set into its eighth position. In this position, the stud 830 contacts a lever 831, and, upon movement of the lever 200 into its ninth position, the stud 830 lifts the arm 831 to move around the shaft 37, upon which it is pivoted. The arm 831 is connected to an arm 832 by a link 833. The arm 832 is connected to a second arm 832 by a yoke 834, and the arms 832 are pivoted on a shaft 218. A spring 835 maintains the arm 832 in lowered position, with a toe 836 on the arm 832 against the shaft 369. The arms 832 carry a rod 838, which extend across the planes of all the levers 74 of the six amount banks.

When the lever 200 is moved into its ninth position, the rod 838 is lifted into the paths of the lower ends of the levers 74, thus locking the studs 73 in the notches of the amount levers, to prevent any movement thereof.

If an amount lever should be adjusted before moving the lever 200 into its seventh, eighth, or ninth position, a segment 205 will be in the path of its corresponding arm 204, thus preventing the transaction lever from being moved past the sixth position. In such event, it is necessary to restore the amount lever 70 to its home position before the transaction lever 200 can be moved beyond the sixth position.

*Setting lever lock*

The amount levers 70 and the transaction lever 200 are provided with notches 72 (Figs. 2 and 4). As before mentioned, the arms 211 and 219 carry between them a universal rod 220, which rod extends across the plane of the setting levers 70 and 200.

Adjacent each lever 70 and 200 is a spring-urged lever 74, pivoted on the shaft 75. Each lever 74 has a shoulder 259 lying in the path of the universal rod 220. When the machine is released for operation and the arms 211 and 219 are rocked counter-clockwise, the rod 220 is moved into engagement with the shoulders 259 of the levers 74 to lock the rollers 73 in the respective notches 72 and 257 of the levers 70 and 200, thereby preventing any adjustment of the levers 70 and 200 during the machine operation.

*Signal device*

The present machine is provided with a signal device for visibly indicating when an amount set up on the levers 70 has been registered, or has not been registered.

A yoke 269 (Figs. 2 and 3) including supporting arms 270, loose on the shaft 75, transverses all the alining levers 74 and is retained in resilient engagement with said levers by springs 271 connected to the yoke 269. One arm 270 of the yoke 269 is provided with an upstanding finger 272, the upper end of which is normally engaged by a flange 273 of a pitman 274, connected to a signal member 284. The signal member 284 is loosely pivoted on the shaft 81 and is normally urged counter-clockwise by a spring 275, one end of which is connected to a stud 276 on the signal member 284 and the other end of which is connected to a stud on the left side frame. The signal member 285 is held in its normal invisible position by engagement of the flange 273 with the upper end of the upstanding finger 272 of the yoke 269. Movement of any lever 70 from its home position, acting on the roller 73, rocks the arms 270 counter-clockwise, thus moving the yoke 269 likewise to withdraw the finger 272 from beneath the flange 273, whereupon the spring 275 moves the signal member, together with the pitman 274 thereon, until arrested by a bifurcated end 277 of the pitman 274 coming into engagement with a stud 278 on a bell crank 279 pivoted on the before-mentioned shaft 203. The bell crank 279 is provided with a foot 280, which normally rests on a collar on the shaft 75, to form a positive stop for the stud 278 and the pitman 274 when released in the manner illustrated in Fig. 3. Release of the signal member 284 moves the signal member in front of a window 281 to indicate that an amount has been set up on the keyboard, which amount has not been registered in the machine.

The cams 111 for engaging the totalizer carry a stud 285 (Fig. 3), which, near the end of the machine operation, engages a downwardly-extending arm of the bell crank 279 to rock said bell crank counter-clockwise. Counter-clockwise movement of the bell crank 279 restores the pitman 274 upwardly, causing the flange 273 to move beyond the upper end of the finger 272, whereupon said finger is spring-returned into the path of said flange to retain the pitman 274 and associated parts in restored position. Upward restoration of the pitman 274 restores the signal member 284 clockwise to normal position.

A shield, mounted on the framework of the machine and lying behind the window 281, has the legend "Registered" thereon, which is visible when the signal member 284 is in its upper position. The signal member 284 has thereon a legend "Not Registered," which is dropped in front of the shield 286 when released, to expose said legend through the window when a setting lever is adjusted.

The amount, clerks', transaction, and account number indicators are visible through the front window 281 and also through a rear window 287. The signal member 284 and a shield 288 are provided opposite the rear window 287, so that the legends "Registered" and "Not Registered" will be exposed to the rear of the machine in the same manner as similar legends are exposed at the front of the machine.

Account number setting levers

As before mentioned, the left-hand section of the machine is provided with a series of setting levers for setting up account numbers on the type lines of the printing mechanism and on the perforator control discs.

The series of account number levers 900 (Figs. 6 and 27) are pivoted on a shaft 500, supported by the frames 28 and 31. Each lever has pivoted thereto a link 901 connected to an indicator setting segment 902, pivoted on a shaft 903 (see also Fig. 25). The segment 902 meshes with a pinion secured to the side of an indicator 904, similar in all respects to the indicators 80 for the amount section.

Each lever 900 is provided with a segment 905, having a series of notches 906, one notch for each position of the lever 900. Coacting with the notches 906 is a stud 907 for each segment 905. The stud 907 is mounted on an arm 908, which is spring-actuated by a spring 909 to normally maintain the stud 907 in contact with a notch 906. When the account number lever 900 is positioned to set up a number on the indicator, on the type wheels in the printer section of the machine, and on a perforator selecting disc in the perforating section of the machine, the stud 907 ratchets in and out of the notches 906.

Upon release of the machine for operation, the studs 907 are all locked in the respective notches 906, so that the levers 900 cannot be moved during a machine operation. To accomplish this, a yoke 910, which lies over the rear sides of all of the arms 908, is provided, which is locked in position by the machine release mechanism; but which is normally held in the position shown in Fig. 6 by a spring 911. When the machine is released for operation, the shaft 230 is rocked in a clockwise direction in the manner hereinafter described, to position a locking finger 912 thereon over the surface 913 of one arm of the yoke 910, thus locking the studs 907 in the respective notches 906.

When a lever 900 is in a position intermediate any setting positions, the arm 908, actuated thereby through a notch 906 and a stud 907, holds the yoke 910 in a moved position, in which one arm of the yoke is held in the path of movement of the arm 912 on the release shaft 230. Therefore, when any one or more of the account number levers 900 are in an intermediate position, the machine release shaft 230 is locked, and the machine cannot be released for operation.

Each lever 900 is provided with a series of teeth 913, each of which meshes with a gear 914, one gear 914 being secured to a respective one of a nest of tubes 915 (see also Fig. 25 and Fig. 26A) mounted on the beforementioned shaft 814. Secured to the side of each gear 914 is an intermediate gear 916, which gears are connected to the type setting section of the machine by means presently described. The right-hand ends of the sleeves 915 have connected thereto gears 917 (Fig. 26B) in the perforator section of the machine to set up perforator selecting discs, as hereinafter described.

Each order of account number lever gears 916 is connected to the printing section of the machine by a different gear train. The units order gear 916 (Fig. 26A) meshes with a pinion 919 secured to a sleeve 920 on the shaft 92, to the left-hand end of which is secured a units type wheel 921.

The tens order gear 916 meshes with a pinion 922 secured to a sleeve 923 mounted on the sleeve 920, the left-hand end of which is secured to a type wheel 924.

The hundreds order gear 916 meshes with a pinion 925, secured to a sleeve 926 on the beforementioned shaft 93. The left-hand end of the sleeve 926 has secured thereto a type wheel 927.

The one thousand order gear 916 meshes with a pinion 928 secured to a sleeve 929, rotatably mounted on the beforementioned sleeve 926, and the sleeve 929 has secured thereto a type wheel 930.

The ten thousand order gear 916 meshes with a pinion 931 secured to the right-hand end of a sleeve 932, which carries a pinion 933 on its left end. The pinion 933 meshes with a gear 934 on a sleeve 935 carried by the shaft 814. The left end of the sleeve 935 carries a gear 936 meshing with a type wheel 936 on the shaft 92.

The hundred thousand gear 916 meshes with a pinion 938 secured to a sleeve 939 surrounding the beforementioned sleeve 929 and to the left end of which is secured a pinion 940 meshing with a gear 941, secured to a sleeve 942, to the left-hand end of which is secured a gear 943, meshing with a type wheel 944.

The highest order gear 916 meshes with a pinion 945 secured to a shaft 946, to which is also secured a gear 947, meshing with a gear 948, on a sleeve 949, to which is also secured a gear 950. The gear 950 meshes with a type wheel 951.

Each of the type wheels on the shaft 92 and each of the type wheels on the shaft 93 is adapted to mesh with a gear like the gears 936 and 934, so that the positioning of one type wheel on one line will position the corresponding type wheel on the other line commensurate therewith.

Referring to Fig. 26A, it will be seen that the type wheels 90 for setting up the amounts, and the type wheels for setting up the account numbers, are positioned on the same shaft and lined therewith, and similar type wheels are set on the shaft 93 adjacent the amount type wheels 91. Therefore, during the printing operation, the amount set up on the amount type wheel and on the account number type wheel will be on a single line, and the data will be printed therefrom simultaneously.

A special lever 960 adjacent the highest order account number lever is provided for restoring all of the account number levers 900 to their normal positions simultaneously. The lever 960 is pivoted on the shaft 500 and has secured thereto a yoke 961 (Fig. 6) having a bar extending over and being in contact with all of the segments 905 of the account number levers 900, when the lever 960 is positioned to its full-line position, shown in Fig. 6. Normally, the lever 960 assumes the position shown by chain lines, in which position the yoke 961 is above and out of contact with the segments 905, thus permitting the setting of the account number levers 900. At the end of the operation of the machine, the lever 960, being in the chain line position, is grasped by the operator and moved upwardly into its full-line position, during which movement the yoke 961 engages the positioned extensions 905 and restores the extensions and all of the levers 900 to their normal positions, in which they are shown in Fig. 6.

Perforator section

Located between the account number section of the machine and the amount and transaction sections of the machine is a mechanism for perforating a record strip 970 (Fig. 28). The construction of the perforator section of the machine is shown in Figs. 7 to 25 inclusive.

Perforator strip

The record strip 970 is fed from a supply roll 971 (Fig. 7) carried on an arbor 972, rotatably mounted in a rockable frame 973. The frame 973 is rockable on a shaft 1035, carried by frames 803 and 804, for rendering the arbor 972 accessible for replacing a new supply roll 971 of paper, in the manner described hereinafter.

The strip 970 is fed below a roller 974 on a stud 975 carried between two removable frames 976 and 977 (see Fig. 25). From the roller 974, the paper 970 is guided through a paper chute 978, supported on studs 979 on the frames 976 and 977. The paper chute 978 is curved, and the forwardly-extending terminal of the chute projects into the open mouth of a second paper chute 980 supported on studs 981 carried by a pair of arms 1088. The forward end of the paper chute 980 guides the paper between the punches of a perforator mechanism, hereinafter described, and below a roller 982, carried by swinging arms in a manner hereinafter described. The perforator strip 970 is provided with feed perforations 983 on each edge thereof, for engagement with teeth 984 on each side of a feed drum 985 (see also Fig. 8). The feed drum 985 is mounted on, and clutched to, a shaft 986 in a manner hereinafter described. The paper 970 is guided over the drum 985 and around a roller 959, carried by a spring-tensioned arm 987 pivoted on a stud 988 on a rockable frame 992. A spring 989 tends to rotate the arm 987 to maintain the roller 959 in constant engagement with the paper 970 and the drum 985 to hold the paper in engagement with the teeth 984 of the drum 985.

From the roller 959, the paper 970 is guided onto a receiving roll 990, rotatably mounted on a spool carried by a stud 991 mounted in the rockable frame 992. The rockable frame 992 is pivoted on a stud 1014 carried by a bracket mounted on the cash drawer cabinet 33.

Perforated strip feeding mechanism

Figure 18:
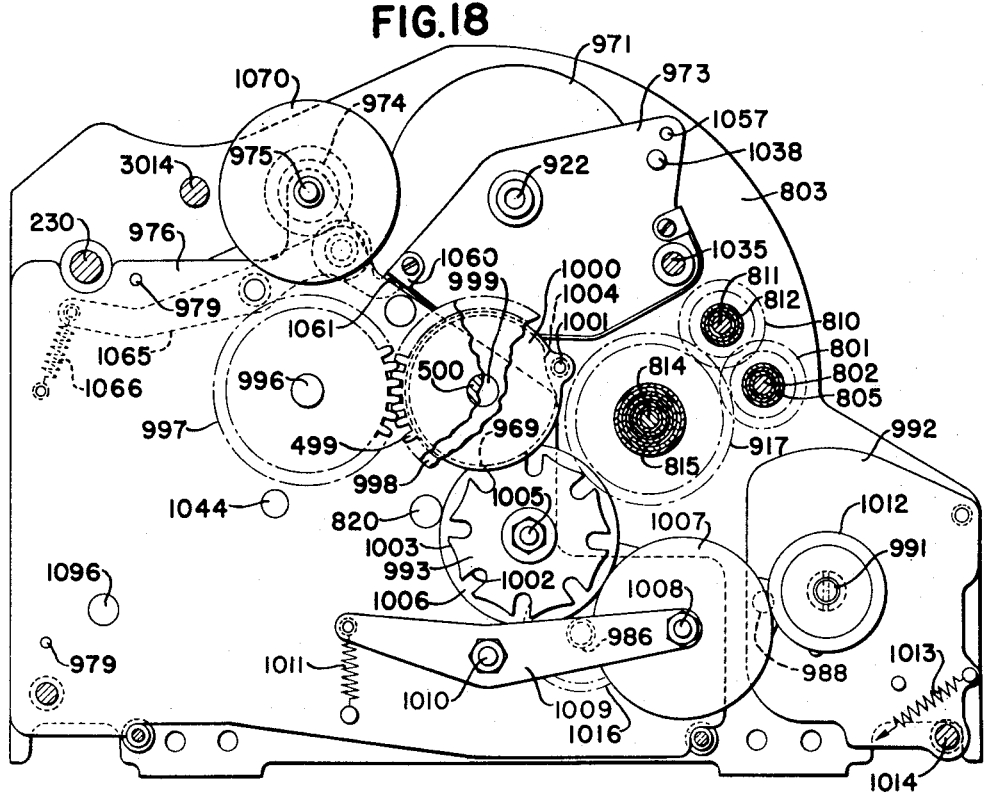
Fig. 18 is a side elevational view of the perforating section of the machine.

To feed the perforated strip onto the spool for the receiving roll 990, the shaft 991 is actuated step by step by a Geneva mechanism, including the Geneva gear 993 (Fig. 18). The Geneva gear 993 is driven from the main shaft 37 (Fig. 25) by a train of mechanism including the following:

Secured to the shaft 37, between the frames 803 and 977, is a gear 994, which meshes with a gear 995 secured to a shaft 996, which shaft is journaled in the frames 976 and 977. Also secured to the shaft 996 adjacent the frame 804 is a gear 997 (see also Figs. 18 and 21), which gear meshes with a gear 998 on a stud 999 secured in the frame 976. Secured to the side of the gear 998 is a disc 1000, on which is mounted a stud 1001 adapted to engage in the notches 1002 of the Geneva gear 993. Secured to the side of the disc 1000 is a locking disc 969, normally engaging surfaces 1003 of the Geneva gear, to lock the Geneva gear against rotation until the stud 1001 engages a notch 1002, whereupon a clearance notch 1004 in the locking disc 969 permits rotation of the Geneva gear by the stud 1001. The Geneva gear is mounted to rotate on a stud 1005 carried by the frame 976 and has secured thereto a feed roller 1006 engaged by a friction roller 1007 rotatably supported on a stud 1008, carried by a rockable arm 1009 pivoted on a stud 1010. A spring 1011, connected to the arm 1009, maintains the friction roller 1007 against the feed roller 1006.

The friction roller 1007 is also held in engagement with a feed roller 1012, secured to the shaft 991, to which the spool for the receiving roll 990 is clutched.

When the shaft 37 is rotated during operation of the machine, the disc 1000 will be rotated clockwise by the gears 994, 995, 997, and 998. When the disc 1000 rotates, the stud 1001, entering a notch 1002 of the Geneva gear, rotates the Geneva gear counter-clockwise, which movement is transferred by the friction roll 1007 to the feed roll 1012, to feed the perforated strip one step and wind said strip on the spool clutched to the shaft 991.

As before mentioned, the receiving roll 990 is mounted on a rockable frame 992. A spring 1013, connected to the rocking frame 992, normally holds the feed roll 1012 against the friction roll 1007.

The friction roll 1007 is located in relation to the feed rollers 1006 and 1012 to permit variable rotating speed of the receiving roll 990. When the spool for the receiving roll is almost empty, its angular movement must be greater than when the spool is filled. Thus, when the Geneva gear rotates the friction roll to feed the paper onto the receiving spool, the friction connection between the friction roll 1007 and the feed roll 1012 permits a variable feed of the perforated strip. As the roll becomes filled and the paper becomes stretched taut, the friction roll 1007 tends to move downwardly around the pivot point 1010 as the limit of feeding movement of the paper is reached. The novel construction of the feed rollers and the friction roller is such that an automatic constant feed of the perforated strip is obtained.

Figure 19:
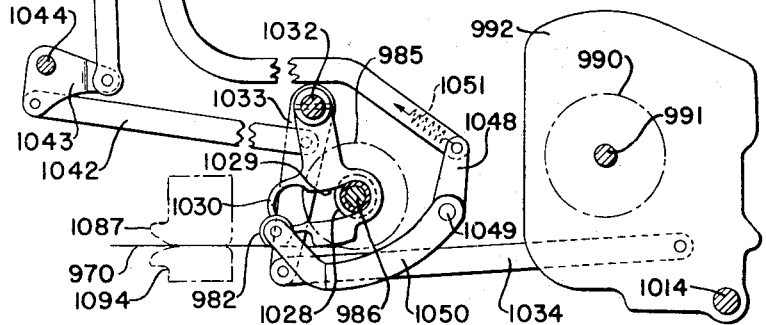
Fig. 19 is a detail view showing the interlocks which are effective to lock the machine against release when a new supply of paper is being positioned in the machine and in the event the paper becomes broken or its supply becomes exhausted.
Figure 20:
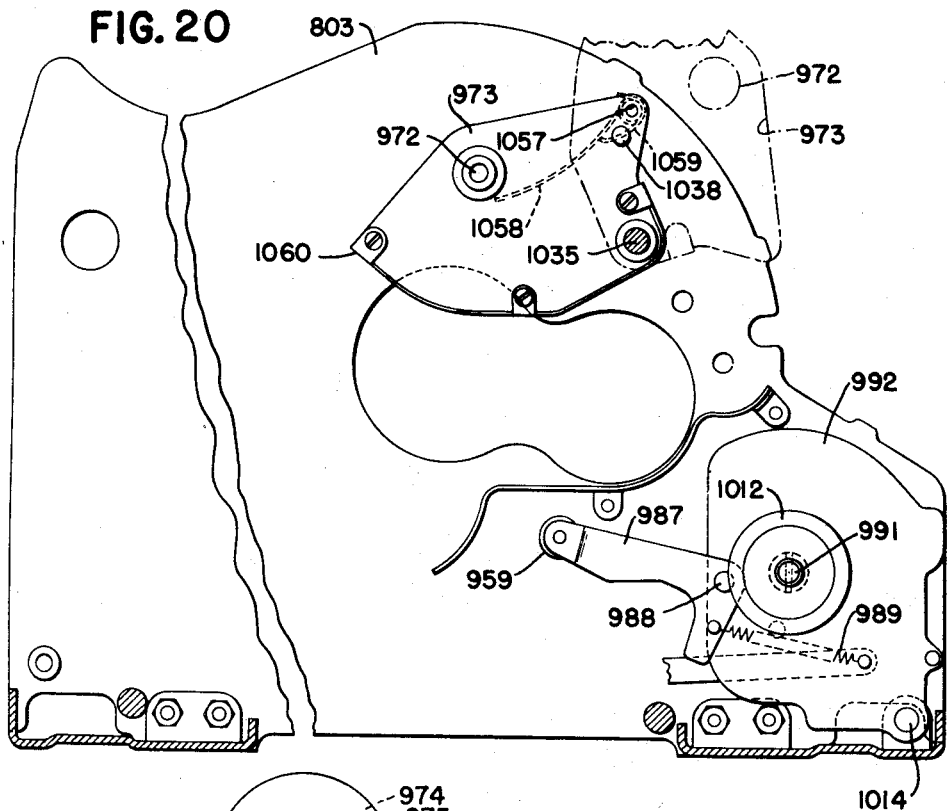
Fig. 20 is a detaail view showing the elements of the perforating section of the machine which remain in the machine when the removable unit carrying the perforating mechanism is removed from the machine for inspection or repair.

When it is desired to remove the perforated strip from the spool on the shaft 991, the operator grasps the rockable frame 992 and rocks it clockwise, as viewed in Fig. 19, around the pivot shaft 1014 to permit easier access thereto for removal of the perforated strip and for the starting of the feeding of a new strip.

When a new strip is placed in the machine, which strip has the pre-perforated feed openings 983, it is necessary that the feed drum 985 rotate freely, and for this reason the drum 985 should be disconnected from its driving mechanism when the new paper is being inserted into the machine. For this purpose, the drum 985 is clutched to the shaft 986 by a clutch mechanism which disengages the drum 985 from the shaft 986 when the rockable frame 992 is moved into its accessible position.

The feed drum 985 is advanced step by step by the Geneva gear through a gear 1015 (Fig. 21) secured to the locking plate 1000, and said gear is located adjacent the frame 976 (see Fig. 25). The gear 1015 meshes with a gear 1016 secured to the above-mentioned shaft 986. The feed drum 985 is clutched to the shaft 986.

The clutch mechanism for clutching the feed drum 985 to the shaft 986 is shown in detail in Figs. 8 and 9. As shown here, the right end of the drum 985 is recessed to receive a ratchet wheel 1020, which is normally engaged by the tooth 1021 of a pawl 1022. The pawl 1022 is pivoted on a stud 1023, carried by a plate 1024 secured to the shaft 986. A spring 1025 normally maintains a tooth 1021 in engagement with the ratchet wheel 1020, where it is locked by a finger 1026 of the pawl 1022 in engagement with the hub 1027 of a collar 1028. The collar 1028 is slidably mounted on the shaft 986 and is provided with an annular groove normally engaged by a slot 1029 (Figs. 10 and 19) of a cam arm 1030, which is provided with a laterally-extending cam portion 1031 (Fig 8) for engagement with said groove. When the parts are in the position shown in Figs. 8 and 9, with the hub 1027 in engagement with the finger 1026, the tooth 1021 is locked in engagement with the ratchet 1020. Then, during a machine operation, when the shaft 986 is rotated in the manner hereinbefore described, the plate 1024, rotating the pawl 1022, causes the tooth 1021 to carry the ratchet 1020 and therefore the feed drum 985 therewith.

When the rocking frame 992 is rocked in a clockwise direction (Fig. 19) to render the receiving roll spool accessible, the cam arm 1030 is rocked counterclockwise, together with the shaft 1032, journaled in the frames 976 and 977, to which it is pinned. This rocking movement of the shaft 1032 and the arm 1030 is obtained by an arm 1033, also secured to the shaft 1032, to the lower end of which is pivoted a link 1034, the opposite end of which link is pivoted to a rockable frame 992.

When the rockable frame 992 is rocked clockwise about the stud 1014 to render the receiving roll spool accessible, the link 1034 is moved to the right, thus rocking the arms 1033 and 1030 in a counter-clockwise direction to cause the cam 1031 on the arm 1030 to shift the collar 1028 to the right (Fig. 8) to withdraw the hub 1027 from engagement with the finger 1026 by moving said hub out of the path of movement of said finger. When the hub 1027 is out of the path of the finger 1026, the ratchet wheel is free to rotate independently of the disc 1024, and therefore the feed drum 985 can be rotated independently of the shaft 986. During such independent rotation of the feed drum 985, the pawl 1021 ratchets in and out of the ratchet teeth on the ratchet wheel 1020.

Machine release interlock

It is desirable to prevent release of the machine for operation when the rockable frame 992 is out of its normal position. To prevent such release, a slide 1040 (Fig. 19) is moved into the path of an arm 1041, secured to the machine release shaft 230 adjacent the frames 977 (see Fig. 25). The slide 1040 is moved into such position by a link 1042, having one end pivoted to the beforementioned arm 1033 and the opposite end pivoted to a bell crank 1043 pivoted on a shaft 1044, to which the slide 1040 is also pivoted.

When the rockable frame 992 is rocked clockwise (Fig. 19) and the link 1034 is moved to the right, the arm 1033 is rocked counter-clockwise to shift the link 1042 toward the right. Movement of the link 1042 to the right rocks the bell crank 1043 counter-clockwise to raise the slide 1040 into the path of movement of the arm 1041, and therefore the release shaft cannot rock to release the machine for an operation. When the rockable frame is again returned to its normal position, as shown in Fig. 19, the link 1034, the arm 1033, the link 1042, and the bell crank 1043 restore the slide 1040 into its normal position, as shown in Fig. 19, whereupon the machine can be released for operation.

It is also desirable to prevent operation of the machine when the perforated paper becomes exhausted, or torn so that no machine operation can be performed without paper in the machine to receive the perforated data. To accomplish this end, a bell crank 1045, pivoted on a shaft 1046, is provided, which is moved into the path of the arm 1041 on the release shaft 230 when no paper is in the perforator section of the machine. The bell crank 1045 has connected thereto a link 1047, the lower end of which is secured to an arm 1048 pivoted on a stud 1049. Secured to the arm 1048 is an arm 1050, carrying the roller 982, normally overlying and supported on the perforated paper strip 970. A light spring 1051 normally maintains the roller 982 in contact with the top of the paper 970, where the arm 1045 is held out of the path of the arm 1041. Upon failure of the paper 970, due either to breakage or to the paper becoming exhausted, the spring 1051 rocks the arms 1048 and 1050 to lower the roller 982. This rocks the arms 1050 and 1048 counter-clockwise and shifts the link 1047 to the left to rotate the bell crank 1045 counter-clockwise into the path of the arm 1041. From this it is clear that, if there is a failure of paper due to tearing, or due to the exhaustion of paper in the machine, the machine is locked against releasing movement.

When the frame 992 is rocked clockwise to replace a roll of paper, or to repair a break in the paper, the link 1034, the arm 1033, the link 1042, and the bell crank 1043 raise the link 1040 as hereinbefore described. If at this time the bell crank 1045 is in the path of the arm 1041, due to the roller 982 having dropped because of a breakage in the paper, the link 1040 engages the bell crank 1045 and rocks the bell crank clockwise (Fig. 19) to lift the roller 982 out of the path of the paper when the breakage thereof is being repaired.

Supply roll support

The beforementioned rockable frame 973, in which the supply roll 971 is supported, is pivotally mounted on a shaft 1035. The rockable support 973 is held in the normal position, shown in Fig. 7, by a latch 1036 pivoted on a stud 1037 carried by the frame 976 (see Fig. 22) The latch 1036 is normally held in engagement with a stud 1038, carried by the rockable frame 973, by a spring 1053, having one end attached to a flange on the latch and the other end to a stud on the frame 976. A stud 1054 limits the movement of the latch 1036 by the spring 1053. The latch 1036 is provided with a finger piece 1055, by means of which the latch can be rocked clockwise to release it from the stud 1038. After the latch is released from the stud 1038, the frame 973 can be rocked into the position shown by chain lines in Fig. 20, where the arbor 972 for the supply roll is easily accessible for replacing the exhausted supply roll with a fresh roll. After the new supply roll has been inserted on the arbor 972, the rockable frame 973 is rocked back into the position shown in Fig. 7, and during such movement the stud 1038, engaging the edge 1056 of the latch, cams the latch downward against the action of the spring 1053 until the notch of the latch can again come into contact with the stud 1038, whereupon the rocking frame 973 is again latched in operated position.

Mounted on a rod 1057 (Fig. 20) is a spring-actuated tension plate 1058, which is urged into contact with the outer periphery of the supply roll by a spring 1059 to create sufficient tension to brake the rotating movement of the supply roll during the machine operation.

Figure 21:
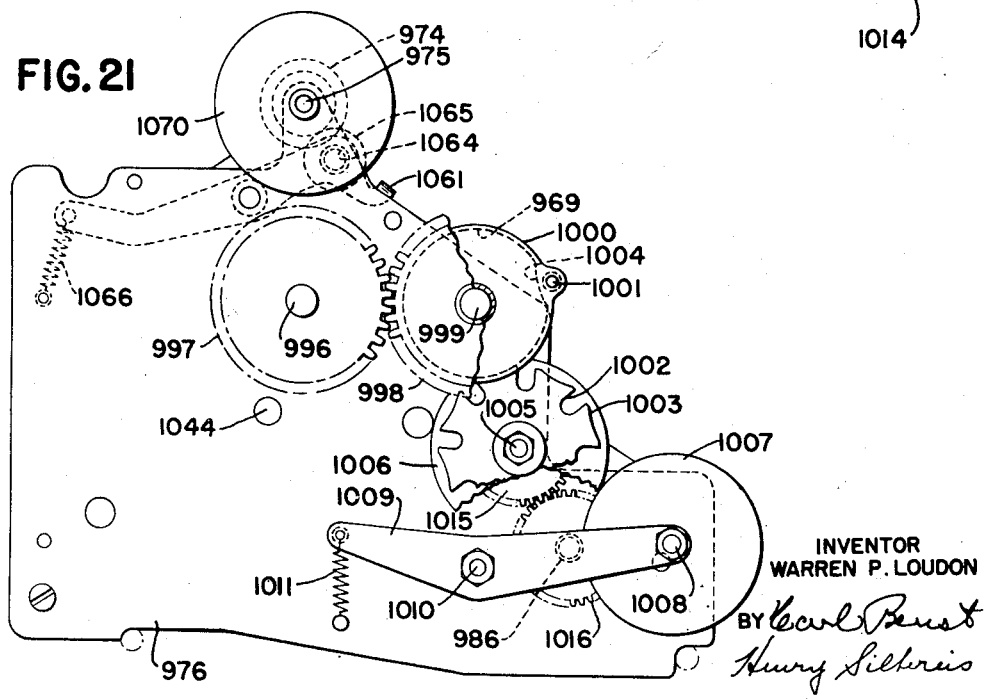
Fig. 21 is a detail view of the removable part of the perforating section of the machine.

The rockable frame 973 is provided with a yoke 1060, which normally overlies fingers 1060 of two arms 1062 pivoted on a shaft 1063. The two arms 1062 carry between them a shaft 1064, on which is mounted a roller 1065. The arms 1062 are urged counter-clockwise by springs 1066. One end of each is connected to a stud 1067 carried by each arm 1062, and the other end of each is connected to a stud 1068, one of which is carried by each frame 976 and 977. The yoke 1060 is so located in relation to the fingers 1061 that, when the rockable frame 973 is in its normal position, the roller 1065 is held out of engagement with the paper strip 970 and its guide roll 974. When the rockable frame 973 is moved into the chain-like position (Fig. 20), the yoke 1060 is withdrawn from contact with the fingers 1061, thus permitting the spring 1066 to raise the roller 1065 into engagement with the paper 970 and the roller 974. The position of the parts when the rockable frame 973 is moved is shown in Fig. 21. A knurled disc 1070 (Figs. 21 and 24), secured to the shaft 975, provides a convenient means for feeding the end of the paper through the paper chute when a new supply of paper is threaded through the machine. To start the paper through the machine, the operator depresses the fingers 1061 and inserts the end of a new paper between the rolls 1065 and 974. Then, upon release of the fingers 1061, the spring 1066 causes the end of the paper to be gripped between the rollers 974 and 1065. Then, upon rotation of the knurled disc 1070, the paper is fed through the paper chute 978 into the chute 980, past the perforating mechanism up to the feed drum 985.

Receiving roll latch

The spool upon which the receiving roll 990 is mounted is provided with a latch for maintaining the arbor in position in the rockable frame 992. This latch is shown in Fig. 23. The arbor 972 for the receiving roll spool is provided with an annular groove, which is engaged by a square opening 1075 of a latch 1076. The latch 1076 is slidably mounted on two studs 1077 and is spring-urged downwardly (Fig. 23) by a spring 1078 to cause the square opening 1075 to engage the annular groove in the arbor. When it is desired to remove the arbor of the supply roll from the rockable frame 973, the operator grasps a finger piece 1079 of the latch 1076 and slides it upwardly to disengage the square opening 1075 from the annular groove in the arbor, whereupon the arbor can be withdrawn from the rockable frame 973.

Perforating code

Fig. 17 illustrates the code used to represent the various data. The ordinals above the vertical lines indicate the data represented. For example, for a zero, no perforations are used. To represent "1," a perforation is made on the top line; "2" is represented by a perforation on the second line; "3" combines the perforation of 1 and 2, which results in a perforation in the first and second lines; "4" is represented by a perforation in the third line; and "5" is a combination of a 4 and 1 perforation, which results in a perforation on the first and third lines; "6" represents a combination of the perforations for the 4 and the 2, which results in perforations in the second and third lines; "7" is represented by a perforation in the fourth line; "8" is represented by perforations combining the perforations for 7 and 1, which results in a perforation in the top line and one in the fourth line; "9" is represented by a perforation which combines the perforations for 7 and 2, which results in perforations in the second line and in the ninth line. "10" is represented by a combination of the representation of 7 and 3, which results in three perforations, one in the top line, one in the second line, and one in the fourth line. "11" is represented by a combination of the perforations for 7 and 4, which results in perforations in the third line and in the fourth line.

The perforating control disc 821, as shown in Fig. 16, shows how the disc is constructed to obtain perforations for ten division orders, that is, for each order except the "Pence" order, and for the Pence order a twelve division control disc is provided. The disc is illustrated with the zero position on a horizontal line at the right, in which position no punch-operating projections are shown on the disc 821. However, the four possible positions assumed by such projections are shown in dotted line in this figure. The diagonal lines which terminate with a digit indicate the position assumed when that particular data is set up at the perforating line.

Perforating mechanism

The perforating mechanism is shown in enlarged view in Fig. 15 and includes, in each order, four punches 1085, slidably mounted in a frame 1086, having flanges 1087 secured to a pair of arms 1088 (Fig. 13). Each punch is provided with a shoulder 1089, and a spring 1090 engages the under side of the shoulder 1089 at one end, and the bottom of the frame 1086 at its other end, to force the punch 1085 upwardly, where a second shoulder 1091 on the punch 1085 is arrested by the upper inner wall of the frame 1086. The punches 1085 project into openings in the bottom of the frame 1086, which are in alinement with openings 1092, formed in a frame 1093. The frame 1093 is provided with flanges 1094, by which it is also secured to the pair of arms 1088.

When the perforator selecting discs 821 are adjusted by their appropriate levers in the manner hereinbefore described, projections 1095 on the selecting disc 821 are selectively positioned above the punches 1085. After the selecting discs 821 have been properly positioned and the machine is operated, the arms 1088 are rocked to raise the punches 1085 into contact with whichever one or more of the projections 1095 have been moved in the path thereof. As the punches are raised, they come into selective contact with the projections 1095 and arrest the punches. Continued movement of the frame 1086 forces the selected punches 1085 downwardly through the paper and into the openings 1092 to perforate data on the strip in accordance with the setting of the selecting discs 821, as represented by the code (Fig. 17).

The pair of arms 1088 are pivotally mounted on a shaft 1096 (Figs. 7, 11 and 13). The upper end of each arm 1088 is provided with a pair of rollers 1097, which are in engagement with a pair of cams 1098, there being a pair of cams 1098 provided for each arm 1088, as indicated in Fig. 12. The cams 1098 are secured to the beforementioned cam shaft 996, which shaft receives one clockwise rotation (Figs. 7, 11 and 13) each operation of the machine. Clockwise rotation of the cams 1098, coacting with the rollers 1097, rocks the arms 1088 first counterclockwise and then clockwise. During the counterclockwise movement of the arms 1088, the punches 1085 are rocked into engagement with the selected ones of the projections 1095 to effect the perforations in the manner just described.

When the arms 1088 are rocked clockwise to their home position, the springs 1090 will normally raise the actuated punches 1085 to the normal position, shown in Fig. 24. However, in the event any of these punches should stick, thus causing the punches to remain in the perforations of the strip and preventing the feeding thereof, a special means is provided to mechanically restore the punches into their home positions. This means includes a plate 2000 (Figs. 7, 11 and 13). The right-hand end of the plate is provided with a comb having teeth bent downwardly into a cam formation, which cam formation is equal to the space between the flanges 1089 and 1091.

During the operation of the machine, immediately after the perforations have been made and the arm 1088 is restored to its home position, the plate 2000 is moved toward the right (Fig. 13), whereupon the cam-formed comb 2000 enters between the punches 1085, cams whichever one may have become stuck, and moves it up to its home position.

The plate 2000 is mounted on rollers 2001 on each arm 1088, so that the plate is supported at each end by the rollers 2001. The plate 2000 has an ear 2002 formed thereon at each end thereof. A rod 2003 is supported between the two ears 2002. The lower bifurcated end of an arm 2004 engages the rod 2003. The upper end of the arm 2004 is pivoted on a shaft 2005 and is secured to a bell crank 2006, carrying a pair of cam rollers 2007. The cam rollers 2007 are in constant engagement with a pair of cam plates 2008 (see also Fig. 12), secured on the beforementioned shaft 996. When the shaft 996 receives its clockwise rotation (Fig. 13), the cam plates 2008, coacting with the rollers 2007, rock the bell crank 2006 and the arm 2004 counterclockwise, which, through the rod 2003, shifts the plate 2007 toward the right (Fig. 13) to release the punches 1085 in the manner hereinbefore described.

*Perforator selecting disc alining means*

In order that the projections 1095 of the selector plates 821 are held in perfect alinement with the punches 1085, an aliner mechanism, shown in Fig. 14, is provided. The beforementioned gear 819, which is a part of the train of gears for setting the perforator selecting discs 821, has every other tooth omitted therefrom and an alining notch formed in the place thereof. An aliner 2010, pivoted on the beforementioned shaft 1044, engages the alining notches in the gear 819 during the machine operation, just prior to the perforting operation. Secured to the aliner 2010 is a bell crank 2011, carrying a pair of cam rollers 2012 engaging with a pair of cam plates 2013 (see also Fig. 12), and the cam plates 2013 are secured on the beforementioned cam shaft 996. When the cam shaft 996 is rotated clockwise during the machine operation, the cams 2013 rock the bell crank 2011 counterclockwise, thus carrying the aliner arm 2011 into engagement with the aliner teeth of the gear 819. The timing of the cam plates 2013 is such that the aliner 2010 becomes effective to aline the selecting discs 821 just before the cam plates 2008 rock the perforating frame to effect a perforating operation.

*Perforator confetti tray*

In order to collect the confetti punched out of the perforated strip, a tray 2015 (Fig. 1) is provided, located directly beneath the punching mechanism. Details of the construction and mounting of the tray 2015 can be found in the above-mentioned parent case.

*Printing mechanism*

The machine as illustrated herein is provided with printing mechanism for printing totals directly from the totalizer, for printing on an audit tape, and for printing on an issuing receipt. For a detailed description of the various printing mechanisms, reference may be had to the above-mentioned parent case.

While the form of mechanism herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. In a machine of the class described, the combination of perforating means, a plurality of elements to control the perforating means for perforating data, a plurality of differentially settable manipulative devices movable from normal positions to adjust said elements for perforating codes representing data, a transaction manipulative device settable to identify different kinds of entries, and means actuated by the transaction manipulative device when adjusted to a certain position to lock the plurality of differentially settable manipulative devices in said normal positions to thereby cause a special code to be perforated during the subsequent machine operation.

2. In a machine of the class described, the combination of perforating means, a plurality of elements to control the perforating means for perforating data, a plurality of differentially settable manipulative devices movable from normal positions to adjust said elements for perforating codes representing data, a transaction manipulative device settable to identify different kinds of entries, an aliner for each of said plurality of differentially settable manipulative devices to aline the devices in set positions, and means operable by said special transaction manipulative device when moved into a certain position to engage the aliners to lock all of said differentially settable manipulative devices against manipulation to lock the plurality of manipulative devices in normal positions to thereby cause a special code to be perforated during a subsequent machine operation.

3. In a machine of the class described, the combination of perforating means, a plurality of elements to control the perforating means for perforating data, a plurality of differentially settable manipulative devices movable from normal positions to adjust said elements for perforating codes representing data, a transaction manipulative device settable to identify different kinds of entries, means actuated by the transaction manipulative device when adjusted to a certain position to lock the plurality of differentially settable devices in said normal positions to thereby cause a special code to be perforated during the subsequent machine operation, and means settable by any one of said plurality of manipulative devices when moved out of normal positions to prevent movement of the transaction manipulative device into said certain position.

4. In a machine of the class described, the combination of perforating means, a plurality of elements to control the perforating means for perforating data, a plurality of differentially settable manipulative devices movable from normal positions to adjust said elements for perforating codes representing data, a transaction manipulative device settable to identify different kinds of entries, an aliner for each of said plurality of differentially settable manipulative devices to aline the devices in set positions, means operable by said special transaction manipulative device when moved into a certain position to engage the aliners to lock all of said differentially settable manipulative devices against manipulation to lock the plurality of manipulative devices in normal positions to thereby cause a special code to be perforated during a subsequent machine operation, and means settable by any one of said plurality of manipulative devices when moved out of normal positions to prevent movement of the transaction manipulative device into said certain position.

5. In a machine of the class described, the combination of perforating means; a plurality of elements to control the perforating means for perforating data; a plurality of differentially settable manipulative devices movable from normal positions to adjust said elements for perforating codes representing data; a transaction manipulative device settable to identify different kinds of entries; an aliner for each of said plurality of differentially settable manipulative devices to aline the devices in set positions; a universal rod extending across the paths of movement of all said aliners, said universal rod normally lying out of said paths of movement; spring-actuated means to normally maintain the universal rod in said normal position; and means on said transaction manipulative device to actuate said spring-actuated means when moved into a certain position to move the universal rod into the paths of movement of said aliners to thereby lock the plurality of manipulative devices in normal positions.

6. In a machine of the class described, the combination of perforating means; a plurality of elements to control the perforating means for perforating data; a plurality of differentially settable manipulative devices movable from normal positions to adjust said elements for perforating codes representing data; a transaction manipulative device settable to identify different kinds of entries; an aliner for each of said plurality of differentially settable manipulative devices to aline the devices in set positions; a universal rod extending across the paths of movement of all said aliners, said universal rod normally lying out of said paths of movement; spring-actuated means to normally maintain the universal rod in said normal position; means on said transaction manipulative device to actuate said spring-actuated means when moved into a certain position to move the universal rod into the paths of movement of said aliners to thereby lock the plurality of manipulative devices in normal positions; a member differentially settable by each one of said plurality of manipulative devices; and a plurality of devices settable by the transaction manipulative device, said members movable into the path of movement of said devices when the plurality of manipulative devices are moved out of normal position, to prevent setting the transaction manipulative device when any one of the plurality of manipulative devices is moved out of normal position.

7. In a machine of of the class described, the combination of perforating means; a plurality of elements to control the perforating means for perforating data; a plurality of differentially settable manipulative devices movable from normal positions to adjust said elements for perforating codes representing data; a transaction manipulative device settable to identify different kinds of entries; an aliner for each of said plurality of differentially settable manipulative devices to aline the devices in set positions; a universal rod extending across the paths of movement of all said aliners, said universal rod normally lying out of said paths of movement; spring-actuated means to normally maintain the universal rod in said normal position; means on said transaction manipulative device to actuate said spring-actuated means when moved into a certain position to move the universal rod into the paths of movement of said aliners to thereby lock the plurality of manipulative devices in normal positions; a segment plate differentially settable by each one of said plurality of manipulative devices, each of said segments having a locking surface; a plurality of arms equal in number to the number of said segment plates and each arm being movable in the same plane as the segment plates move; a common support for said arms; and a link connecting the common support to said transaction manipulative device whereby the transaction manipulative device moves the arms when adjusted, said locking surfaces movable into the paths of movement of said arms when the plurality of manipulative devices are moved out of normal positions to thereby prevent movement of the transaction manipulative device into said certain position when the plurality of manipulative devices are out of their normal positions.

8. In a machine of the class described, the combination of perforating means; a plurality of elements to control the perforating means for perforating data; a plurality of differentially settable manipulative devices movable from normal positions to adjust said elements for perforating codes representing data; a transaction manipulative device settable to identify different kinds of entries; an aliner for each of said plurality of differentially settable manipulative devices to aline the devices in set positions; a universal rod extending across the paths of movement of all said aliners, said universal rod normally lying out of said paths of movement; spring-actuated means to normally maintain the universal rod in said normal position; means on said transaction manipulative device to actuate said spring-actuated means when moved into a certain position to move the universal rod into the paths of movement of said aliners to thereby lock the plurality of manipulative devices in normal positions; a segment plate differentially settable by each one of said plurality of manipulative devices, each of said segment plates having a locking surface; a plurality of arms equal in number to the number of said segment plates and each arm being movable in the same plane as the segment plates move; a common support for said arms; and a link connecting the common support to said transaction manipulative device whereby the transaction manipulative device moves the arms when adjusted, any one of said locking surfaces being movable into the path of one of said arms when any one of the plurality of manipulative devices is moved out of normal position, to thereby prevent movement of the transaction manipulative device into said certain position when any one of the plurality of manipulative devices is moved out of its normal position.

9. In a machine of the class described, the combination of perforating means; a plurality of elements to control the perforating means for perforating data; a plurality of differentially settable manipulative devices movable from normal positions to adjust said elements for perforating codes representing data; a transaction manipulative device settable to identify different kinds of entries; an aliner for each of said plurality of differentially settable manipulative devices to aline the devices in set positions; a universal rod extending across the paths of movement of all said aliners, said universal rod normally lying out of said paths of movement; spring-actuated means to normally maintain the universal rod in said normal position; means on said transaction manipulative device to actuate said spring-actuated means when moved into a certain position to move the universal rod into the paths of movement of said aliners to thereby lock the plurality of manipulative devices in normal positions; a segment plate associated with each of said plurality of manipulative devices; a spring normally urging each segment plate into engagement with its associated manipulative devices, whereby each segment plate is adjusted according to the adjustment of its associated manipulative device; a locking surface on each segment plate; a plurality of arms equal in number to the number of said segment plates and each arm being movable in the same plane as the segment plates move; a common support for said arms; and a link connecting the common support to said transaction manipulative device whereby the transaction manipulative device moves the arms when adjusted, said locking surfaces movable into the paths of movement of said arms when the plurality of manipulative devices are moved out of normal positions to thereby prevent movement of the transaction manipulative device into said certain position when the plurality of manipulative devices are out of their normal positions.

10. In a machine of the class described, the combination of perforating means; a plurality of elements to control the perforating means for perforating data; a plurality of differentially settable manipulative devices movable from normal positions to adjust said elements for perforating codes representing data; a transaction manipulative device settable to identify different kinds of entries; an aliner for each of said plurality of differentially settable manipulative devices to aline the devices in set positions; a universal rod extending across the paths of movement of all said aliners, said universal rod normally lying out of said paths of movement; spring-actuated means to normally maintain the universal rod in said normal position; means on said transaction manipulative device to actuate said spring-actuated means when moved into a certain position to move the universal rod into the paths of movement of said aliners to thereby lock the plurality of manipulative devices in normal positions; a segment plate associated with each of said plurality of manipulative devices; a spring normally urging each segment plate into engagement with its associated manipulative device, whereby each segment plate is adjusted according to the adjustment of its associated manipulative device; a locking surface on each segment plate; a plurality of arms equal in number to the number of said segment plates and each arm being movable in the same plane as the segment plates move; a common support for said arms; and a link connecting the common support to said transaction manipulative device whereby the transaction manipulative device moves the arms when adjusted, any one of said locking surfaces being movable into the path of one of said arms when any one of the plurality of manipulative devices is moved out of normal position, to thereby prevent movement of the transaction manipulative device into said certain position when any one of the plurality of manipulative devices is moved out of its normal position.

WARREN P. LOUDON.

References Cited in the file of this patent

UNITED STATES PATENTS

| Number | Name | Date |
| --- | --- | --- |
| 1,325,195 | Goldberg | Dec. 16, 1919 |
| 1,506,056 | Goldberg | Aug. 26, 1924 |
| 1,795,115 | Green | Mar. 3, 1931 |
| 2,022,385 | Pasinski | Nov. 26, 1935 |